United States Patent
Hamm et al.

(10) Patent No.: US 8,801,242 B2
(45) Date of Patent: Aug. 12, 2014

(54) LIGHT MODULE OF MOTOR VEHICLE FOR GENERATING SPOT DISTRIBUTION OF HIGH-BEAM-LIGHT DISTRIBUTION AND VEHICLE HEADLIGHTS HAVING SUCH MODULE

(75) Inventors: Michael Hamm, Eningen u.A. (DE); Ernst-Olaf Rosenhahn, Bodelshausen (DE); Emil P. Stefanov, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 320 days.

(21) Appl. No.: 13/445,032

(22) Filed: Apr. 12, 2012

(65) Prior Publication Data

US 2012/0275173 A1    Nov. 1, 2012

(30) Foreign Application Priority Data

Apr. 27, 2011  (DE) .......................... 10 2011 017 630
Jun. 16, 2011  (DE) .......................... 10 2011 077 636

(51) Int. Cl.
*B60Q 1/00*        (2006.01)

(52) U.S. Cl.
USPC .......................................... 362/487; 362/507

(58) Field of Classification Search
CPC ................................ F21Y 2101/02; F21K 9/00
USPC .................................. 362/460, 487, 507, 543
See application file for complete search history.

(56) References Cited

U.S. PATENT DOCUMENTS 7,513,659 B2 *  4/2009  Vukosic et al. ................ 362/373

FOREIGN PATENT DOCUMENTS

| DE | 10204481 A1    | 8/2003  |
|----|----------------|---------|
| DE | 10252228 A1    | 8/2003  |
| DE | 10302969 A1    | 8/2004  |
| DE | 102005017528 A1| 3/2006  |
| DE | 102005012303 A1| 9/2006  |
| DE | 102007033438 A1| 1/2009  |
| DE | 102007049309 A1| 4/2009  |
| DE | 102008044968 A1| 7/2009  |
| DE | 102008013603 A1| 9/2009  |
| DE | 202010006097 U1| 9/2010  |
| DE | 102009020619 A1| 11/2010 |
| DE | 102009053581 B3| 3/2011  |
| DE | 102010033902 A1| 1/2012  |
| DE | 102011077132 A1| 1/2012  |
| EP | 1640658 A2     | 8/2005  |
| EP | 2085264 A2     | 8/2009  |
| EP | 2280215 A2     | 2/2011  |

\* cited by examiner

*Primary Examiner* — Vip Patel
(74) *Attorney, Agent, or Firm* — Howard & Howard Attorneys PLLC

(57) ABSTRACT

A light module of a motor vehicle generates a spot distribution of a high-beam-light distribution formed by superimposition of the spot distribution and a base distribution generated by at least one other module. The light module comprises a plurality of separately controllable sub-modules that generate a plurality of stripe-shaped segments of the spot distribution that supplement it. Also, a headlight generates the high-beam-light distribution and comprises the light module. Furthermore, a headlight system comprises a pair of the headlights disposed in a front region toward sides of the vehicle and each of which generates the high-beam-light distribution. The headlights include corresponding light modules that generate stripe-shaped segments of left and right sides, respectively, of the spot distribution such that the stripe-shaped segments of the light modules of the headlights supplement the spot distribution or are at least partially superimposed thereon.

21 Claims, 15 Drawing Sheets

LIGHT MODULE OF MOTOR VEHICLE FOR GENERATING SPOT DISTRIBUTION OF HIGH-BEAM-LIGHT DISTRIBUTION AND VEHICLE HEADLIGHTS HAVING SUCH MODULE

CROSS-REFERENCE TO RELATED APPLICATIONS

This application claims priority to and benefit of the filing date of German Patent Application 10 2011 017 630.6 filed on Apr. 27, 2011 and German Patent Application 10 2011 077 636.2 filed on Jun. 16, 2011.

BACKGROUND OF INVENTION

1. Field of Invention

The invention concerns a light module of a motor vehicle. The light module serves to generate a spot distribution of a high-beam-light distribution. The high-beam-light distribution is formed by a superimposition of the spot distribution and a base distribution generated by at least one other module. The invention also concerns a motor-vehicle headlight for generating a high-beam-light distribution. The headlight includes a light module designed for generating a spot distribution of the high-beam-light distribution. The high-beam-light distribution is formed by a superimposition of the spot distribution and a base distribution generated by at least one other module. Finally, the invention also concerns a headlight system for a motor vehicle including two motor-vehicle headlights disposed in a front region of the vehicle on the sides thereof.

2. Description of Related Art

Light modules of this generic type, or motor-vehicle headlights for generating high beams, with which the high beam is formed by a superimposing of a bundled spot distribution and diffuse base distribution are known from the prior art in various embodiments. An outer edge of the spot distribution becomes relatively diffused at the sides, but has a steeper incline approaching the vertical plane than does the base distribution. The base distribution has a greater range in the horizontal and vertical planes than does the spot distribution. The maximal illumination level of the spot distribution is greater than that of the base distribution. The base distribution not only illuminates a region surrounding the spot distribution in the form of a halo (light panel) with a softly diffused edge, but is also superimposed on the spot distribution and, thereby, contributes to obtaining the desired maximum illumination level in the region of the spot distribution.

The base distribution can be obtained in an arbitrary manner. From the prior art, various light modules for generating a base distribution are known. These can be designed as projection or reflection systems and may include incandescent lamps, gas-discharge lamps, semiconductor-light sources [in particular, light-emitting diodes (LEDs)], or others as the light source.

Corresponding high-beam concepts known from the prior art are, for example, as follows:

Complete High Beam from One or more Reflector Chambers without a Vertical Subdivision A corresponding headlight with a light module for generating a typical halogen high beam can be designed as a bi-xenon headlight or light-emitting-diode (LED) headlight. The known headlight includes a light module for generating a high beam that can, for example, be designed as a reflection or projection module. The light module for generating the high beam can also be designed to generate a low-beam-light distribution—as is the case, for example, with the bi-function modules. Alternatively, the headlight can also include at least one other light module for generating a low-beam-light distribution. A high-beam module having LED light sources can be subdivided into various modules, such as different high-beam-reflector chambers, for example, wherein at least one of the modules or chambers serves to generate the spot distribution and at least one other module or chamber serves to generate the base distribution. It is, however, also conceivable that each of the chambers generates a similar individual light distribution, whereby the individual light distributions are superimposed to form the complete high beam.

Automatic High-Beam Circuitry

A camera-controlled high beam exists up to now in various steps. The simplest step is the high-beam assistant, which switches automatically from high beam to low beam upon detecting oncoming traffic without effect to the light distribution. This function has existed since 1952 and was introduced by General Motors with the name "Autronic Eye."

Automatic Headlight-Range Control

In a module developed by Automotive Lighting for AFS (Adaptive Frontlighting System), functionality relates to a light module designed as a projection module designed to generate a variable light distribution. In particular, not only low beams and high beams can be generated, but also situation-dependent and other light distributions—such as city light, country light, highway light, dynamic-curve light, and practically any other light distribution—can be generated. The xenon bi-function module enables camera-controlled adjustment of the range or level and geometric position of the light and dark borders of a low-beam-light distribution. A control device evaluates the positions of receding or oncoming vehicles and delivers the information to the actuator control, which controls an actuator (e.g., in the form of a multiphase motor for varying the light distribution). By way of example, the geometric position of the light/dark border is then adjusted therein.

Partial High Beam

With partial high beams, a portion of the high-beam-light distribution is selectively shadowed in a xenon high-beam module. For this, moveable (in particular, flat-shutter) configurations hinged on a horizontal axis and/or screening cylindrical diaphragms shade a portion of the high beam in which other road users are detected. As a result, bright/dark zones occur in the high-beam-light distribution. The light module for generating the partially shaded partial high-beam-light distributions or headlights with the light modules are moved by a suitable actuator, or multiphase motor, in such a manner that a receding vehicle or an oncoming vehicle will lie in the region of the dark zone.

A corresponding application is, by way of example, a headlight with an AFS module having a xenon light source and shutter configuration including numerous components, which can be displaced in relation to one another in the plane of the shutter configuration by a sliding-rail guide. The shutter configuration with a sliding-rail guide is known from DE 10 2005 012 303 A1. A corresponding light module is known from, by way of example, EP 1 640 658 A2. By sliding the shutter components in relation to one another, a variable level of the horizontal light/dark border is obtained. The light module alone generates a high-beam-light distribution (i.e., the high beam is not obtained by superimposing a spot- and base-light distribution). "Bi-function" means that the light module is designed for the generation of low beams as well as high beams. The known headlights generate thereby, aside from high beams, low beams conforming to AFS in accordance with Rule 123 UN-ECE.

FIG. 1 shows, by way of example, a light distribution 10 of a partial high beam as it is generated by a headlight in a headlight system of a motor vehicle on a test screen 12 disposed at a distance from the vehicle. A horizontal plane "HH" is indicated on the test screen 12 at 0° on the vertical axis and 0° on the horizontal axis, and a vertical plane "VV" is indicated. The other headlight of the headlight system generates a mirror-image light distribution of the light distribution 10 shown therein, reflected over the vertical plane "VV." The partial high-beam-light distribution 10 according to FIG. 1 generated by a headlight, or the corresponding light module, includes a vertical light/dark border 14 and an intersecting horizontal light/dark border 16, which runs substantially a few tenths of a degree (in particular, 0.57°) below the horizontal axis "HH." The horizontal position of the vertical light/dark borders 14 of the partial high-beam-light distribution 10 can, by way of example, be varied by a horizontal pivoting of the respective light module or entire headlight. By superimposing a left and right partial high beam 10, shaded regions result, which have variable widths and orientations to the road space in front of the motor vehicle.

A corresponding total partial high-beam-light distribution 18 includes the partial high-beam-light distribution 10 generated by a light module of a first headlight from FIG. 1 and partial high-beam-light distribution 10' mirror image of this from a light module of the other headlight. The total light distribution 18 has a shaded zone 20, shown in an exemplary manner in FIG. 2. The vertical light/dark border of the light distribution 10' generated by the other headlight of the headlight system and forming a mirror image of the partial high-beam-light distribution 10 from FIG. 2 is indicated in FIG. 2 at 14'. That the headlight for generating this light distribution 18 includes one or two projection or reflection modules and each module generates a sharp vertical light/dark border 14, 14' is characteristic thereof. For this, a partial high-beam-light distribution 10, 10' having a vertical light/dark border 14, 14' results thereby in each headlight.

A headlight in accordance with this may, for example, have a xenon multi-function module. The xenon multi-function module generates, aside from a low-beam-light distribution below a horizontal light/dark border, the high-beam-light distribution as a whole (i.e., not subdivided according to spot- and base-light distributions).

An LED multi-function module functions analogously to the aforementioned xenon multi-function module and also makes a vertical light/dark border available. Its dimensions, however, are relatively narrow and concentrated on the spot region of the light distribution. For this, it can generate a spot distribution for both low beams as well as for high beams. A corresponding light module is known from, for example, DE 10 2007 049 309 A1. A light distribution generated by an LED multi-function module—such as that resulting on a perpendicular test screen 30 disposed at a distance to the light module—is depicted in an exemplary manner in the upper part of FIG. 3 and indicated as a whole at 32. The vertical light/dark border is indicated at 34, and the bordering horizontal light/dark border is indicated at 36.

A special characteristic of the LED multi-function module and other concepts of this type having LEDs as light sources is the requirement of a second high beam, which supplements the spot-type high-beam-light distribution of the LED multi-function module with a lower intensity and technical demand (e.g., no vertical light/dark borders). A base distribution generated by a corresponding second high-beam module, such as that resulting on a test screen 38, is depicted in an exemplary manner in the lower part of FIG. 3 and indicated at 40. The second high-beam module for generating the base distribution can, for example, be designed as an LED projection module having a cylindrical diaphragm.

Because a single LED chip according to the state of the art emits about 250 lumen (lm), but a gas-discharge lamp emits over 3,000 lm, numerous LED chips are needed to generate the desired, or legally required, illumination value. The thermal load increases in relation to the number of chips packed closely together as well as the expenditure for establishing electrical contact to the LED chips. A module having approximately 14 to 15 closely packed chips would require a great deal of cooling at the current state of the art and, furthermore, be difficult to manage from a light-technology perspective. The known LED multi-function module from Automotive Lighting uses only four LED chips for this reason. A higher LED density is not known.

The wide supplementary high beam, or high-beam base light, necessary for generating a high beam with an LED multi-function module (cf. FIG. 3, lower part) is normally generated from a second module. The LED multi-function module generates the spot-type light distribution as the high beam for this range. The spot distribution has a vertical light/dark border as a partial high beam for oncoming traffic. The base-light module generates a semi-symmetric high-beam base light 40 as a supplement during full high-beam functionality.

Marking Lights

By an additional slit in the xenon or LED bi-function module, a single brightly illuminated vertical stripe above the low-beam light/dark border can be generated for each module. These brightly illuminated stripes may be used as so-called "marking lights" to specifically illuminate objects (people or otherwise) located and detected on the roadway or at the side thereof in front of the vehicle with an intensity similar to that of a high beam. The bright stripe has a horizontal expansion of about 1° to 3° on a perpendicular test screen disposed at a distance to the light module, or on the roadway, and extends in the vertical direction into the actual high-beam region of the light distribution. A lighting system from Automotive Lighting for generating a marking light is known from, for example, DE 20 2010 006 097. The bright stripe of the marking light is generated from a single light module or by a small, separate reflection module in the front region of the motor vehicle—for example, in the bumper.

LED Module with a Matrix-Type LED Light Source Disposed in the Form of a Matrix (Matrix Beam)

For this, a spot beam (high beam) with a relatively limited distribution (about ±15°) is subdivided into individual rectangular pixels disposed in a matrix fashion. The pixels are generated by single LEDs that are disposed in numerous lines and columns in the form of a matrix and can be individually controlled. By this, for example, a high-beam spot can be generated having discreetly modifiable light/dark borders. The LED matrix-type module generates a spot distribution of a high beam, and another arbitrary module (e.g., corresponding to the aforementioned BiG1 module) generates a base-light distribution of the high beams.

A corresponding LED matrix-type module from DE 10 2008 013 603 A1 is depicted, by way of example, in FIG. 4 and indicated as a unit at 60. An optical array 62 of the module 60 can be clearly recognized.

The optical array 62 includes a plurality of funnel-shaped lenses 64 disposed in numerous lines and columns in the form of a matrix, which bundle the light emitted by the light source. Each of the lenses 64 has at least one LED light source 66 designated thereto. The LED light sources 66 may be one LED chip or an array of numerous LED chips disposed in the form of a matrix. A light distribution 72 of the LED matrix-type module 60—as it can result on a perpendicular test screen 74 disposed at a distance to the module 60—is depicted in FIG. 5 in an exemplary manner. The individual pixels of the light distribution 72 can be clearly recognized therein. Each of the pixels is generated by one of the lenses 64. By deactivating individual LED light sources 66, non-illuminated (i.e., dark) pixels of the light distribution 72 can be generated. A light module, or a headlight, for generating a corresponding light distribution 72 is known from DE 10 2009 053 B3 as well as DE 10 2008 013 603 A1.

LED matrix-type modules having about 80 to 120 LEDs are used in pre-development projections. They are disposed in numerous lines and columns in the form of a matrix. At the cost for LEDs and circuit boards (particularly, the circuitry, control, and power-control device) as well as the cooling of the LEDs, there is a relatively high level of expenditure for the matrix-type configurations known regarding development and production. Furthermore, the known LED matrix-type modules are relatively large, which is contrary to the intention—in particular, in the front region of a motor vehicle—of reducing the space required necessary for additional aggregates and functionalities.

Various technologies have been used for some time to generate defined light distributions having horizontally and vertically limited expansions (e.g., for high-beam stripes):

The mapping with a projection system by which the LED light distribution is formed with an aperture (or a slit in an aperture).

The direct mapping of an LED or LED array with a lens. The advantage with this is the small number of parts and relatively shallow installation depth of such systems.

The mapping of an LED or LED array with a reflection system.

A motor-vehicle headlight for generating a dynamic high-beam-light distribution is known from EP 2 280 215 A2. The headlight includes numerous light modules each of which has numerous LED light sources. The light modules are disposed in the headlight in numerous lines and columns in the form of a matrix. The LEDs of a light module generate vertical and stripe-shaped segments of the high-beam-light distribution disposed at a distance to one another. The segments generated by the light modules are offset in relation to one another such that the segments of the one light module are disposed between the segments of another light module. For this, the high beam is not, however, generated by superimposing a spot light and a base light; rather, the entire high-beam-light distribution is generated by the light module. Furthermore, due to the nested configuration of the segments generated by the various modules in the high-beam-light distribution, the configuration and alignment of the individual LEDs and light modules are extensive.

A headlight is known from EP 2 085 264 A2 in which the high beam is generated by superimposing a low-beam- and high-beam-light distribution, which only illuminates a high-beam range above a light/dark border. The high-beam-light distribution does not consist, however, of a superimposition of a spot distribution and base distribution.

A vehicle headlight is known from DE 10 2008 044 968 A1 as well as DE 10 2009 020 619 A1 having an LED matrix with numerous LEDs disposed in the form of a matrix in numerous lines and rows adjacent to and on top of one another as the light source. A light distribution can be generated by the LED matrix that corresponds to the configuration of LEDs in the LED matrix subdivided in a plurality of block segments disposed in the form of a matrix. It is not specifically mentioned that the light distribution is a high-beam-light distribution. However, if the light distribution were regarded as such, then this would not be the result, at any rate, of a superimposition of a spot- and base-light distribution.

FIG. 6 shows, by way of example, a light module known from the prior art. In FIG. 6, a projection system 80 is depicted at the left and a reflection system 90 at the right. With a projection system 80, the light generated by a light source 82, or one or more LEDs, is projected through a secondary lens 84 to generate the desired light distribution in front of the vehicle. To generate a low-beam-light distribution, the edge of a shutter configuration 86 can be positioned in the focal plane of the secondary lens 84 for the beam, wherein the secondary lens 84 maps the light passing by the shutter configuration 86 and edge to form the light/dark border in front of the vehicle. The shutter configuration 86 (as shown in FIG. 6) may be aligned vertically or in any other orientation (e.g., horizontally). The light emitted by the light source(s) 82 can be bundled by a primary lens (not shown). The primary lens is, by way of example, designed as a TIR (total internal reflection) front-mounted lens of transparent material having a refractive index of n>1—such as organic or inorganic glass (in particular, PMMA or silicone). A TIR front-mounted lens bundles light passing through it by refraction at the point-of-entry surface or point-of-exit surface of the light as well as by the total reflection at peripheral edge surfaces. The secondary lens 84 (as shown in FIG. 6) may be designed as a projection lens or as a reflector (not shown). With a reflection system 90, the desired light distribution is reflected to the front of the vehicle by reflecting the light generated by the light source(s) 92 on a reflection surface 94.

Light-Forming Components

Various measures and differently designed front-mounted lenses for altering an angle aperture of a light bundle are known from the prior art. Front-mounted lenses of this type are referred to as "cross-section transformers" or "optical commutators."

The optical commutators known from DE 102 52 228 A1 are referenced here by way of example. FIG. 7 shows FIG. 2 of DE 102 52 228 A1, and FIG. 8 shows FIG. 4b of this document, wherein the reference symbols given in FIGS. 7 and 8 relate to the document. The system described in this document is relatively compact, but offers no horizontal or vertical subdivision of the light distribution and generates either a full low beam or full high beam. A subdivision of the high beam in a spot light and base light is not mentioned. The light distribution generated herein (low beam or high beam) is formed by a projection lens (indicated at 20 in FIGS. 7 and 8).

Another example is the optic commutators known from DE 103 02 969 A1, which represent a further development of the optic commutators known from DE 102 52 228 1. In this, additional reflecting surfaces are defined in the optical commutator, which very efficiently enable an effect to be applied to the light. FIG. 9 shows FIG. 2 of DE 103 02 969 A1, and FIG. 10 shows FIG. 5b of this document, wherein the reference symbols given in FIGS. 9 and 10 refer to the document. With the system disclosed in this document, the optical commutator also serves to generate a complete light function. A subdivision of the high beam in a spot light and base light is not mentioned.

Further publications regarding optical commutators are, for example, DE 10 2005 017 528 A1, DE 10 2009 053 581 B3, DE 10 2008 013 603 A1, and DE 102 04 481 A1. Of particular interest is DE 10 2009 053 581 B3, FIG. 5 of which is shown in FIG. 11, wherein the reference symbols given in this figure refer to the document. It is proposed in this document that the optical commutator be subdivided into smaller lenses that can be combined to form a lens array. The foremost characteristic thereof is that the lens array always contains numerous lines and the individual lenses of the array have a square or rectangular surface.

Based on the prior art described, the invention should enable a camera-controlled light function that does not blind oncoming or receding vehicles, but represents for the driver a high beam in the remaining light distribution, thereby enabling an optimal illumination of the roadway and peripheral regions for the vehicle. The objective of the invention is, therefore, to propose a fully functional, simple, and cost-efficiently realizable light module for creating a spot distribution of a high-beam-light distribution.

SUMMARY OF INVENTION

The invention overcomes the disadvantages in the related art in a light module of a motor vehicle for generating a spot distribution of a high-beam-light distribution formed by superimposition of the spot distribution and a base distribution generated by at least one other module. The light module comprises a plurality of separately controllable sub-modules that generate a plurality of stripe-shaped segments of the spot distribution that supplement the spot distribution.

The invention overcomes the disadvantages in the related art also in a motor-vehicle headlight for generating a high-beam-light distribution formed by superimposition of a spot distribution and a base distribution generated by at least one other module. The headlight comprises a light module for generating the spot distribution of the high-beam-light distribution and including a plurality of separately controllable sub-modules that generate a plurality of stripe-shaped segments of the spot distribution that supplement the spot distribution.

The invention overcomes the disadvantages in the related art also in a headlight system for a motor vehicle. The headlight system comprises a pair of motor-vehicle headlights disposed in a front region toward sides of the vehicle and each of which generates a high-beam-light distribution formed by superimposition of a spot distribution and a base distribution generated by at least one other module. One of the headlights includes a light module that generates stripe-shaped segments of a left side of the spot distribution, and the other of the headlights includes a light module that generates stripe-shaped segments of a right side of the spot distribution such that the stripe-shaped segments of the light modules of the headlights either of supplement the spot distribution and are at least partially superimposed thereon.

To achieve this objective, based on the light module of the type specified at the beginning, the spot-light module is subdivided into numerous separately controllable sub-modules, which generate numerous stripe-shaped segments of the spot distribution, wherein the stripe-shaped segments supplement the spot distribution. The stripe-shaped segments have a vertical orientation.

The high beam generated by the headlight according to the invention includes a concentrated spot distribution (e.g., of the type depicted in the upper part of FIG. 3) and wider base distribution (e.g., of the type depicted in the lower part of FIG. 3). A superimposition of the spot and base light results in the desired high beam. For this, the base light can be generated in an arbitrary manner. The base light can be designed as an area illuminated as a unit or subdivided into various block segments. The individual block segments supplement the base distribution. The block segments can be individually activated or deactivated. During the generation of a high beam, the respective block segments of the base light, which would lie in a zone in which another road user has been detected, can be deactivated. If the base light can only be activated or deactivated as a unit, the entire base light can be simply switched "off" after detection of another road user in a zone in front of the motor vehicle to avoid blinding the road user.

A high-beam-light distribution can be understood to mean a light distribution that illuminates a region in front of the vehicle above a horizontal light/dark border of a low-beam-light distribution. With simultaneous activation of the high-beam-light distribution together with the low-beam-light distribution, a high beam corresponding to the legal requirements thereof is obtained. The combination of the high beam from a low-beam-light distribution and high-beam-light distribution can be advantageous for obtaining the greatest variability of the light distribution. Furthermore, by this, it is possible to obtain the higher value for the light flux of the high beam in a simple and cost-efficient manner.

The high-beam-light distribution in the invention also means, however, a high beam that fulfills the legal requirements for high beams according to UN-ECE with an additional light bundle below the light/dark border of, for example, a low-beam-light distribution. A high-beam-light distribution of this type is also, however, composed of a superimposition of a spot distribution and base distribution. For this, in certain circumstances, the spot distribution also extends below the horizontal or light/dark border of a low-beam-light distribution. According to SAE standards for high beams, the high beam must fulfill certain minimum or maximum luminosity levels at points measured below the horizontal plane.

According to the invention, the light module is subdivided into numerous sub-modules each of which includes at least one light source for emitting light. The light sources are, in an embodiment, designed as semiconductor-light sources (for instance, LEDs). Furthermore, each of the sub-modules includes at least one lens component for bundling the light emitted by the light sources. Each lens component is designated to at least one light source. The lens component can be designed as a TIR (total internal reflection) lens (e.g., front-mounted lens) made of a transparent material having a refractive index of n>1 (e.g., PMMA, PC, or silicone). It is, however, also conceivable that the lens component be designed as an open collimator (e.g., conventional reflector). The light bundled and generated by the sub-modules can pass through a secondary lens disposed in the optical path, which maps the individual light bundles of the sub-modules as stripe-shaped segments in front of the vehicle. The secondary lens can be designed, by way of example, as a projection lens or reflector. It is, furthermore, conceivable that the secondary lens be subdivided into numerous partial lenses, wherein each partial lens is designated to one sub-module or a group of sub-modules.

In differing from the previously known matrix beam, the spot distribution of the invention is not disposed in quadratic segments next to and on top of one another in the form of a matrix; rather, it is disposed only in numerous stripe-shaped segments next to one another in a single line each of which is subdivided in substantially vertical longitudinal extensions. The high-beam spot is subdivided, therefore, in stripes with vertical light/dark borders.

These stripes can be generated by front-mounted lenses of the sub-modules adjacently disposed, or coupled to one another, that bundle the light emitted from the light sources and project it in front of the vehicle with the secondary lens. By this, a light distribution results, which, when activated or dimmed, corresponds to a typical high-beam-spot distribution. By switching individual LEDs "on" or "off" or activating or deactivating individual stripes, it is possible to obtain a partial high beam or marking light. The vertical light/dark borders are hardly visible between collectively activated segments.

The sub-modules are, in an embodiment, disposed in precisely one line adjacent to one another in the light module. It is, therefore, necessary to have only one line with light sources disposed adjacently and one linear lens array having numerous lenses disposed adjacently in one line disposed in the light path of the light emitted from the light sources. By this, the electrical contact and cooling of the light sources of the sub-module are substantially simplified. Furthermore, the positioning and attaching of the lens array in front of the light sources are substantially simplified—for instance, if the lens components of the lens array are produced from a flexible material (e.g., silicone). An adjustment of individual lens components in relation to the light source(s) designated thereto is possible because lens components disposed in a line can be accessed and adjusted from two sides externally. In addition, the light module according to the invention has a compact design and is lightweight. The disadvantages that the spot distribution is no longer as finely subdivided and adjustment to traffic conditions in the surroundings of the vehicle is no longer varied to such a fine degree (as is possible with, for instance, the known LED matrix beams) have been consciously accepted to attain the specified advantages of the light module according to the invention. The sequence of the stripe-shaped segments in the spot distribution corresponds to the sequence of the sub-modules in the light module (i.e., sub-modules disposed adjacently generate the light distribution of stripe-shaped segments disposed adjacently to one another).

Each lens component of the linear lens array has at least one of the light-entry surfaces facing the light sources designated to the lens component and coupled to the lens component by the light emitted from the light source(s). The lateral walls of a lens component are, in an embodiment, designed as light-reflecting surfaces (e.g., as fully reflecting border surfaces of a TIR front-mounted lens made of transparent material having a refractive index of n>1) or as mirror surfaces of a reflector to reflect at least the majority of the light coupled thereto. In addition, each lens component has at least one light-exit surface (in an embodiment, opposite the at least one light-entry surface) through which the at least one part of the coupled light is decoupled after one or more reflections on the lateral surfaces (if applicable). The exit surfaces in a light module incorporated in a motor vehicle in accordance with the guidelines are higher than they are wide (for instance, they are stripe-shaped and designed with a longitudinal extension that is substantially vertical). The widths of the lens components are funnel-shaped starting from the light-entry surfaces and extending to the light-exit surfaces such that at least one of the lateral walls of the lens component runs at a diagonal to a longitudinal axis of the lens component. The lateral walls can be planar or bowed in a concave or convex manner.

As a result of the special shape of the lens elements, they cause an expansion of the pixel, or the light-exit surface of the sub-module in the vertical plane. As a result, a clear bundling of the light emitted from the sub-module occurs. This means that the light bundles of individual sub-modules arrive at a secondary lens disposed in the light path more strongly bundled. This can, therefore, have smaller dimensions than was possible with a conventional LED matrix beam. For a secondary lens designed as a projection lens, this means that the lens-permeation surface through which the light bundles of the sub-module pass is smaller. For instance, no (or much less) light passes through the upper and lower edges of the lenses. Because the edges of a lens are responsible for the formation of color fringes in the mapping thereof, by the invention, the color fringes of the spot distribution can be significantly reduced or even nearly eliminated. In addition, it is conceivable that the projection lens be flattened at the upper and lower edges [i.e., the upper and lower-edge regions—through which, due to the stronger light bundling, no (or very little) light passes—can be removed, thus obtaining a flat-shaped secondary lens]. Alternatively, it would also be conceivable to reduce the diameter of the entire lens. By this, the necessary space and weight of the light module can be clearly reduced. Because the projection lenses can normally be seen from outside of the headlight through the cover plate and significantly determine the aesthetic effect of the headlight (the entire front view of the vehicle), for an observer, new design aspects arise for a light module or the entire headlight as the result of a lens that is designed to be flat and wide (i.e., wider than it is high). This is all possible without loss to the light emitted by the light sources, which would decrease the effectiveness or efficiency of the light module.

According to an embodiment of the invention, the sub-modules each have at least one light source, and, during operation of the light module, at least one light source of at least the respective sub-module is deactivated, the stripe-shaped segment of which lies in a zone in which another road user has been detected. For the detection of other road users (for instance, of receding or oncoming vehicles), the motor vehicle can be equipped in the front region with a camera configuration that is, for example, disposed behind the windscreen (for instance, between a rearview mirror and the windscreen). The images recorded by the camera of the region in front of the vehicle are processed by a suitable image-processing unit with the aim of detecting road users depicted in the images and determining their location. The image-processing unit can send a corresponding control signal to the light module for controlling the light sources of the sub-modules such that a blinding of the detected other road user is prevented.

The stripe-shaped segments are, in an embodiment, vertically oriented in the spot distribution. According to an embodiment, the ratio of the length of the stripe-shaped segments to the width thereof is at least 3:1 (in an embodiment, as much as 10:1). The width of the individual stripe-shaped segments on a perpendicular test screen disposed at a distance from the light module is, in an embodiment, approximately 1° to 3° (in another embodiment, 1° to 1.5°). As a result, taking into account the above height-to-width ratio, a height of the stripe-shaped segments of, in an embodiment, approximately 3° to 20° is obtained (in another embodiment, 5° to 15°) (in even another embodiment, 5° to 8°). The height for this is, in an embodiment, measured starting from a horizontal light/dark border of a low-beam-light distribution. It is also conceivable, however, that the stripe-shaped segments of the spot distribution extend downward into a low-beam region below the horizontal light/dark border.

The individual stripes of the high-beam-spot distribution have a maximum illumination level of >60 lux (lx) (in an embodiment, 80 lx to 120 lx). This applies to the central segments of the spot distribution close to vertical. The outer segments in the edge regions of the light distribution have a relatively lower maximal illumination level of approximately 30 lx to 50 lx. The luminosity of the segment upward can decrease in illumination level while the illumination level should remain uniform (homogenous) to the greatest degree possible in the (limited) horizontal plane.

The horizontal expansion of the spot distribution formed by the stripe-shaped segments, in an embodiment, has a maximum of ±20° and minimum of ±5°. In an embodiment, the spot beam has a minimal width of ±5° and maximal width of ±10°. In the entire region of the spot distribution, individual segments or segment groups can be specifically switched "on" or "off" by activating or deactivating the light sources of the corresponding sub-modules. The light distribution is, in an embodiment, designed such that (differently from that with a known xenon bi-function module) no additional mechanical pivoting of the light module in the horizontal plane (e.g., by the mechanism of a mechanical curve light) is required to dim the respective positions of other road users in front of the motor vehicle.

With the invention, the optical commutators described in the prior art above have been improved. DE 102 52 228 A1 and DE 103 02 969 A1 relate to optical commutators having no vertical subdivision and supplied by a wide light source (LED array or light conductor with a xenon-/incandescent-light coupling).

Differently from the description in DE 10 2009 053 581 B3, the invention does not use individual pixels of about 1°×1° or 1.2°×1°; instead, the invention uses vertical stripes. The stripes can be generated with the known light module, however, by vertically interconnected pixels from the lens array. This would, however, result in unreasonably high costs and expenditure with the LEDs, circuitry, control, and cooling that are used.

The individual coupling components for the optical commutators of the light module according to the invention, disposed adjacent to one another, may have different designs. In this manner, for example, the central stripes can be designed with a modified outer surface for conducting light to improve the efficiency and enable an even higher maximum illumination level. It is, furthermore, conceivable that the height of the exit surfaces of the individual optical-commutator components decreases at the edges such that the height of the stripe-shaped segments also decreases toward the edge. The optical commutators are supplied, in an embodiment, by at least one individually controllable semiconductor-light source [in an embodiment, in the form of a light-emitting diode (LED)]. It is understood that the use of numerous LEDs for each optical commutator of the linear lens array is also conceivable. It is conceivable in this case for the individual LEDs, all of which are designated to the same optical-commutator component, to be designed such that they can be separately controlled such that, by way of example, the individual stripe-shaped segments can be not only switched "on" and "off," but also dimmed.

The light module according to the invention has numerous semiconductor-light sources disposed adjacently in exactly one line, which emit visible light. A primary lens is disposed in the light path of the semiconductor-light sources [designed as a linear lens array having numerous components (optical-commutator components) that function as lenses, are disposed adjacently in exactly one line, and bundle the light emitted by the semiconductor-light sources]. At least one secondary lens is disposed in the further course of the light path, which maps the light bundle for obtaining the high-beam-spot distribution in front of the motor vehicle. In accordance with an embodiment of the invention, the primary lens has additional optically effective exit lenses disposed after the lens array aside from the linear lens array having the optically effective components in the light path. Each of the optically effective components has numerous exit lenses designated to it (firstly, a main exit lens with collecting characteristics on the optical axis of the optically effective component and, secondly, aside from the main exit lens, at least on secondary exit lens). A majority of the light bundled by one of the optically effective components passes through the main exit lens designated to the optically effective component, and the rest of the light bundled by the optically effective component passes through one or more of the secondary exit lenses designated to the optically effective component. In this embodiment, despite the segmenting of the spot distribution, a homogenous light distribution without undesired pronounced maximum or minimum intensities can be generated. This is obtained, for instance, in that the light beams directed outwardly are deflected even more outwardly by the bowed exit lenses such that they do not pass through the secondary lens nor contribute to the generation of the light distribution. This principle is described in detail in DE 10 2009 053 581 B3, but is used, however, first in connection with the light module according to the invention. In connection with the invention, the high-beam-spot distribution is subdivided into smaller and larger segments than with a known LED matrix-type beam such that the maximum intensities between the individual segments are more significantly and pronouncedly visible.

The light module according to the invention can be disposed at an arbitrary position in the front region of a motor vehicle. In an embodiment, the light module is, however, a component of a motor-vehicle headlight.

Aside from the spot-beam module, at least one additional light module for generating a base distribution can be disposed in the front region of the motor vehicle, wherein a high-beam-light distribution results from a superimposition of the spot distribution and base distribution. In an embodiment, the base-light module is likewise disposed in the headlight. According to an embodiment of the motor-vehicle headlight of the invention, the control of the light sources of the sub-module is coordinated with the control of the base-light module such that, simultaneously with a deactivation of at least the respective part of the base distribution (which would lie in the zone in which another road user is detected), the at least one light source of the at least one sub-module to be deactivated is deactivated. In this manner, it is possible, despite the simplified construction of the headlight according to the invention, to ensure that the region in front of the motor vehicle is always optimally illuminated (i.e., the largest area possible) and, at the same time, a blinding of other road users is prevented.

In conclusion, the invention also concerns a headlight system of a motor vehicle including two motor-vehicle headlights according to the invention disposed in a front region of the vehicle and separated at a distance from one another. One of the two headlights includes a light module generating the stripe-shaped segments of a left side of the spot distribution, and the other headlight includes a light module that generates the stripe-shaped segments of a right side of the spot distribution such that the stripe-shaped segments of the light modules of the two headlights supplement the entire spot distribution (or at least overlap in part).

The light modules of the left and right headlights of a motor vehicle, therefore, generate different light distributions according to the invention. If, for example, the headlight system of a vehicle generates a spot distribution subdivided into a specific number (e.g., 24) of stripe-shaped segments, the light modules each have as a maximum the same number (e.g., 24) of sub-modules. In this case, the partial light distributions generated by the individual headlights in the spot distribution generated by the headlight system would overlap (i.e., each segment of the spot distribution generated by the headlight system then consists of a superimposition of a segment generated by the left headlight with a corresponding segment generated by the right headlight). With the spot distribution generated by the headlight system having a specific number (e.g., 24) of stripe-shaped segments, each of the light modules has at least one-half of that number (e.g., 12) of sub-modules. In this case, the respective partial light distributions generated by the two headlights are disposed adjacently in the high-beam spot generated by the headlight system (i.e., the two partial light distributions would supplement the spot distribution). Each segment of the spot distribution is formed solely by one of the segments generated by one of the headlights substantially without overlapping from other segments.

It is also conceivable that the headlights include a specific number of sub-modules lying between the minimum and maximum number. In this case, the partial light distribution generated by the individual headlights would only partially overlap in the central region of the spot distribution. The central segments of the spot distribution would be formed, therefore, by an overlapping of the segments generated by the two headlights while the outer segments of the spot distribution would be formed solely by segments generated by one of the headlights without overlapping from other segments. With an (at least partial) overlapping of the partial light distribution in the spot distribution, the light modules in the headlights can be created with fewer sub-modules and would, thereby, be smaller, lighter, and less expensive. However, in this case the individual sub-modules must emit a larger luminous flux and generate a higher illumination level to fulfill the legal stipulations or customer specifications regarding the minimal intensity values of the spot distribution or the high beam.

It is, furthermore, conceivable that the light modules in the headlights (in relation to a headlight housing) or headlights themselves (in relation to a vehicle body) can be designed such that they can pivot horizontally independently of one another to, by way of example, be able to vary the degree of overlapping of the partial light distributions generated by the two headlights in the resulting spot distribution. It is, furthermore, conceivable to create a curve-light function by the horizontally pivoting of the light modules or headlights. In this case, the base light can continue to be directed forward such that the curve-light function is created solely by moving a portion of the high beams (specifically, the high-beam spot).

Other objects, features, and advantages of the of the invention are readily appreciated as the same become better understood while the subsequent description of the is read taken in conjunction with the accompanying figures of a drawing thereof.

BRIEF DESCRIPTION OF EACH FIGURE OF DRAWING OF INVENTION

Figure 1:
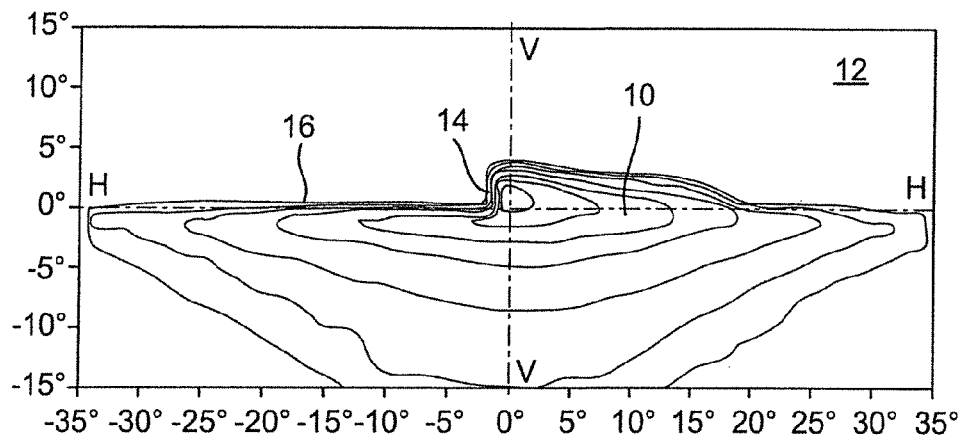
FIG. 1 is a part of a partial high-beam-light distribution generated by a light module or headlight known from the prior art.
Figure 2:
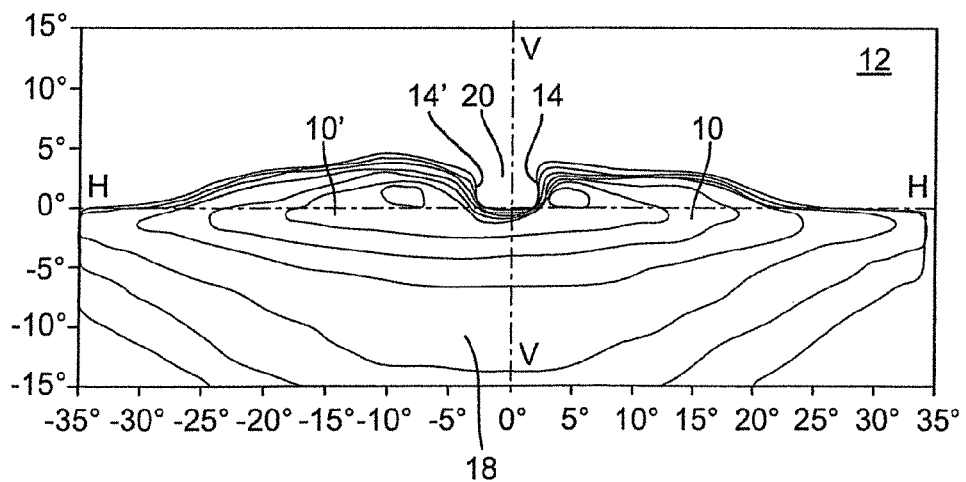
FIG. 2 is a partial high-beam-light distribution known from the prior art.
Figure 3:
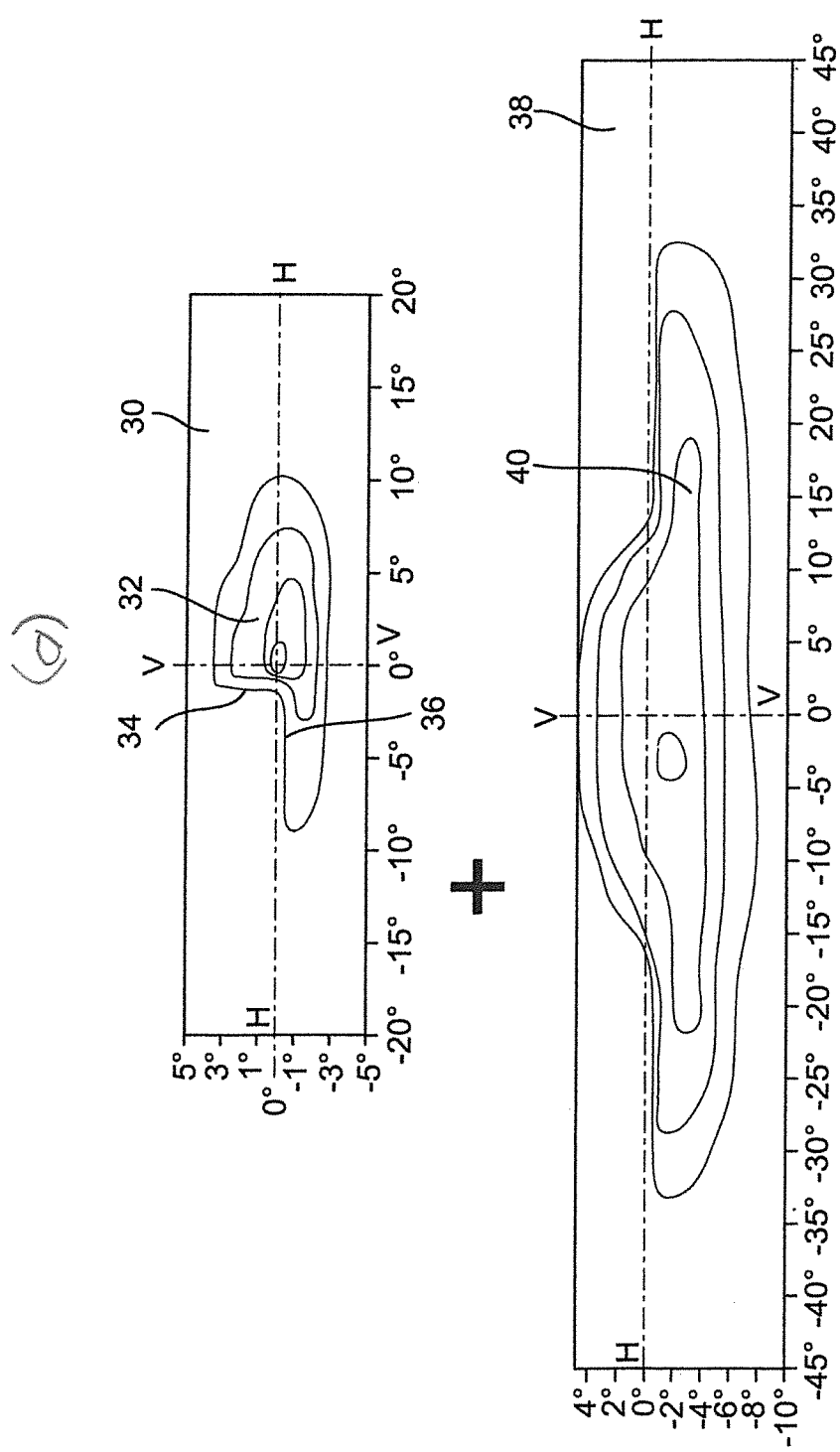
FIG. 3(a) is an upper part: a spot distribution of a high-beam-light distribution generated by an LED spotlight module known from the prior art.
FIG. 3(b) is a lower part: a base distribution generated by a light module known from the prior art.
Figure 4:
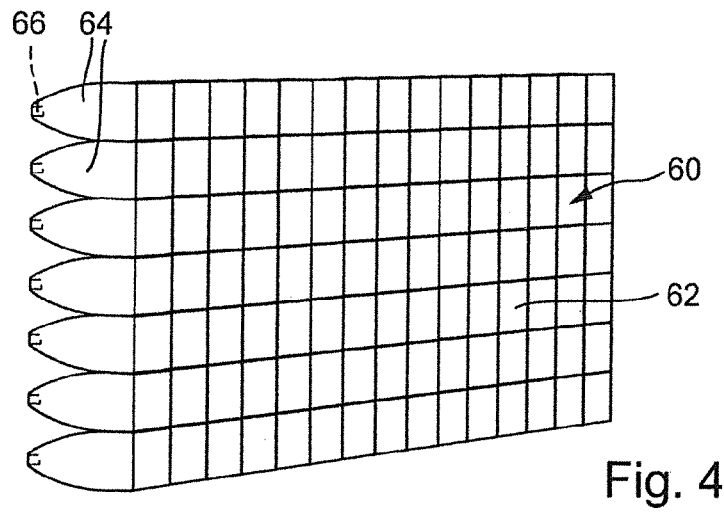
FIG. 4 is a lens array in a perspective view known from DE 10 2008 013 603 A1.
Figure 5:
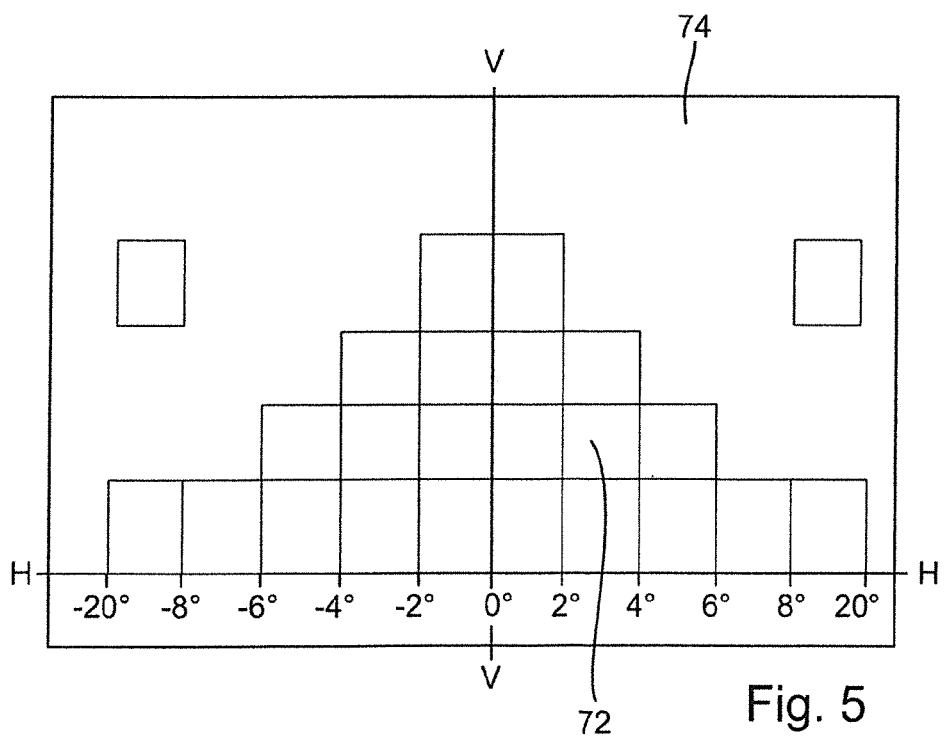
FIG. 5 is a spot distribution of a high-beam-light distribution generated by an LED matrix-type module known from the prior art according to DE 10 2009 053 581 B3.
Figure 6:
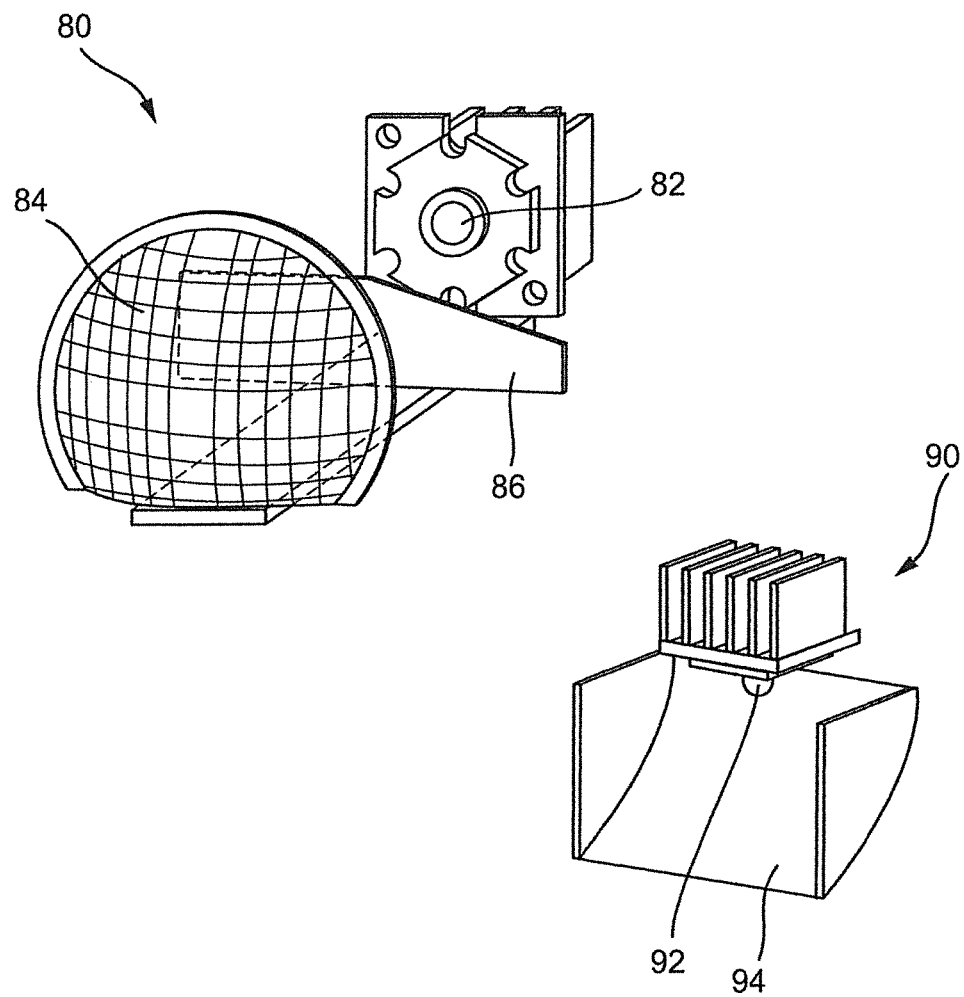
Figure 7:
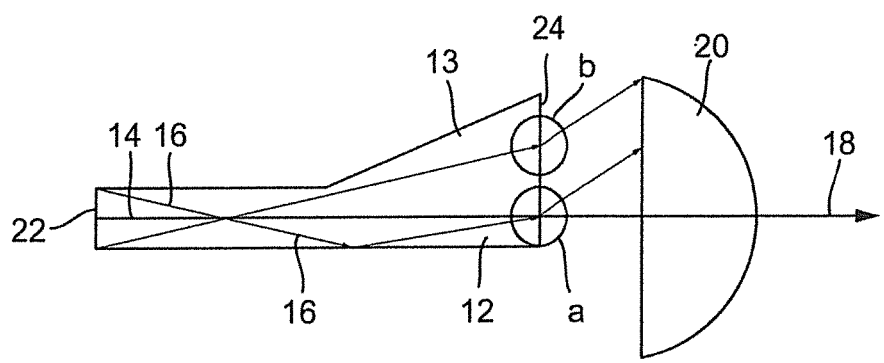
Figure 8:
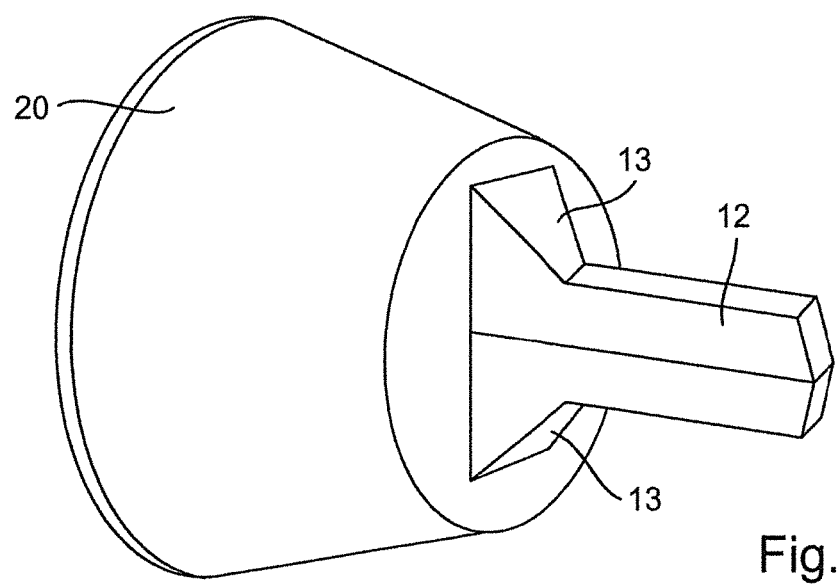
Figure 9:
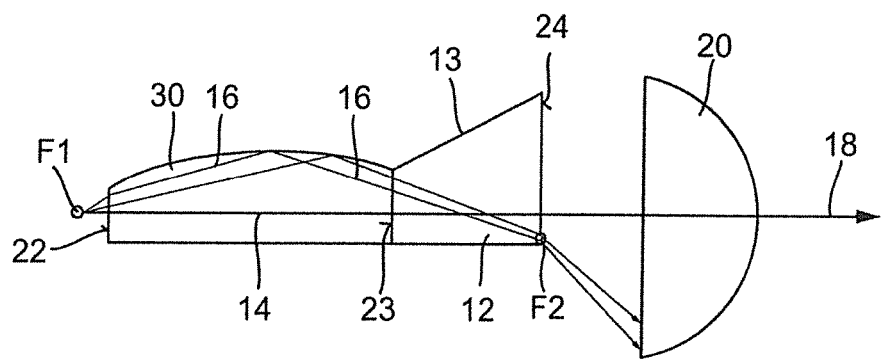
Figure 10:
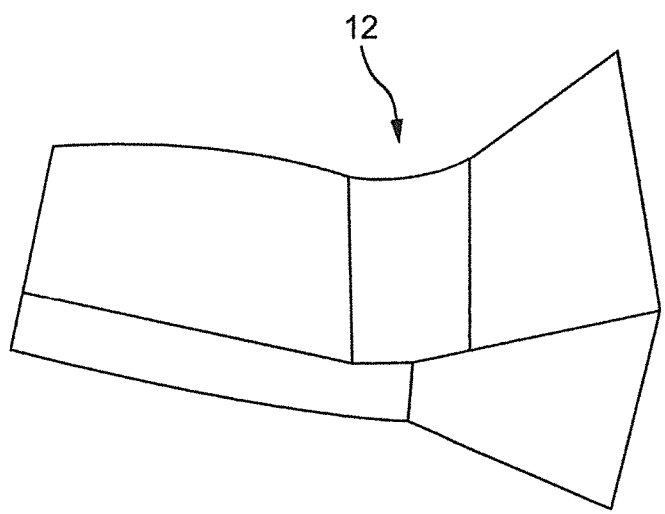
Figure 11:
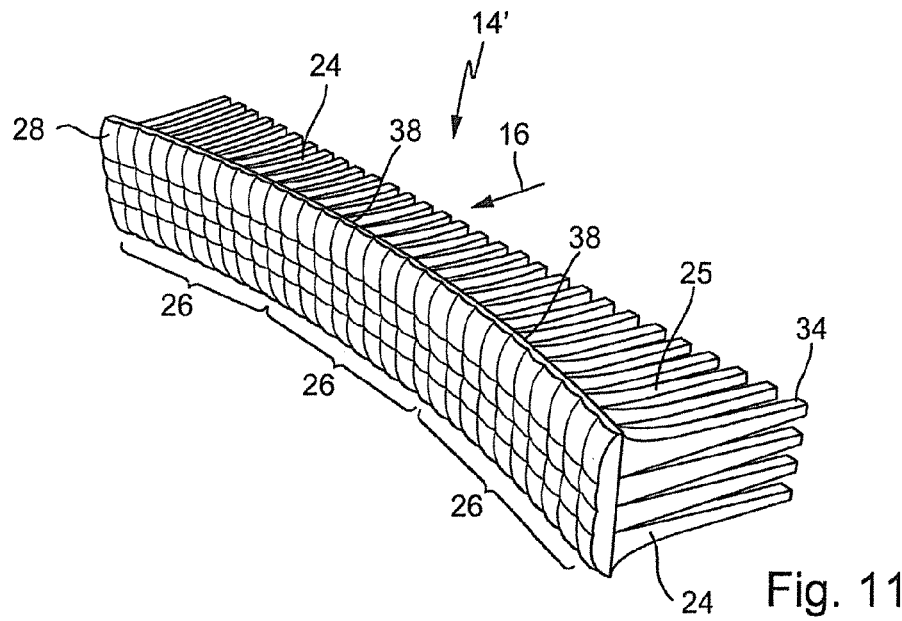
Figure 12:
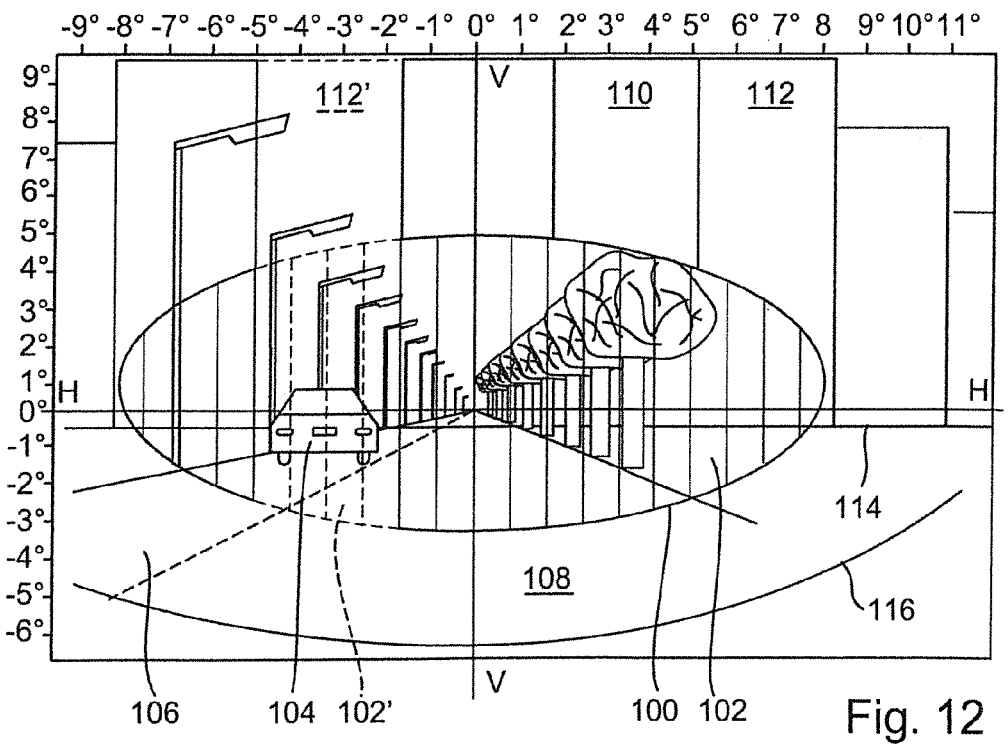
Figure 13:
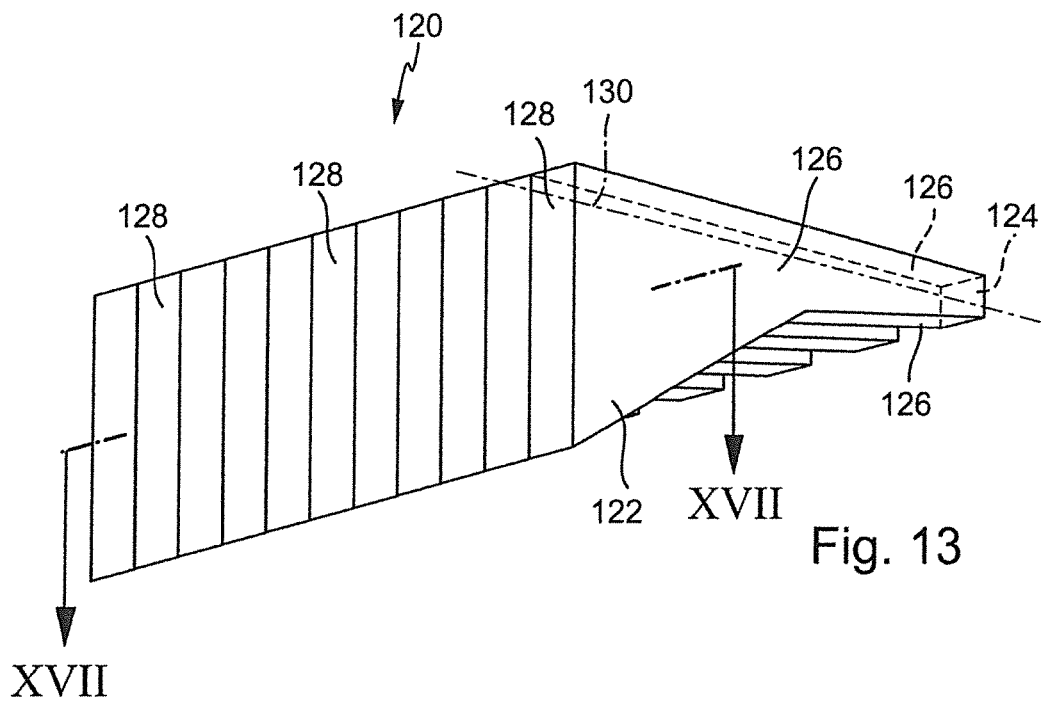
Figure 14:
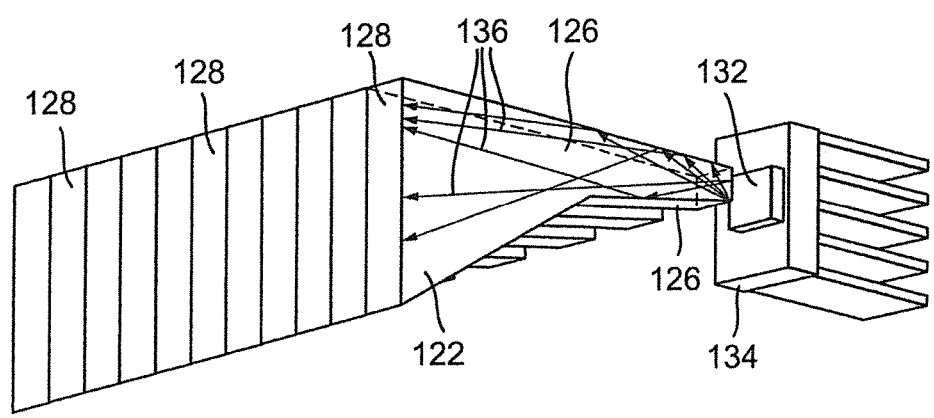
Figure 15:
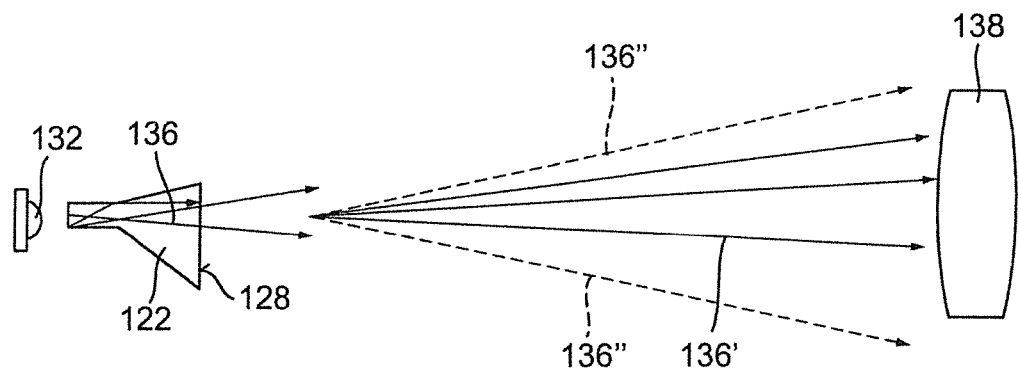
Figure 16:
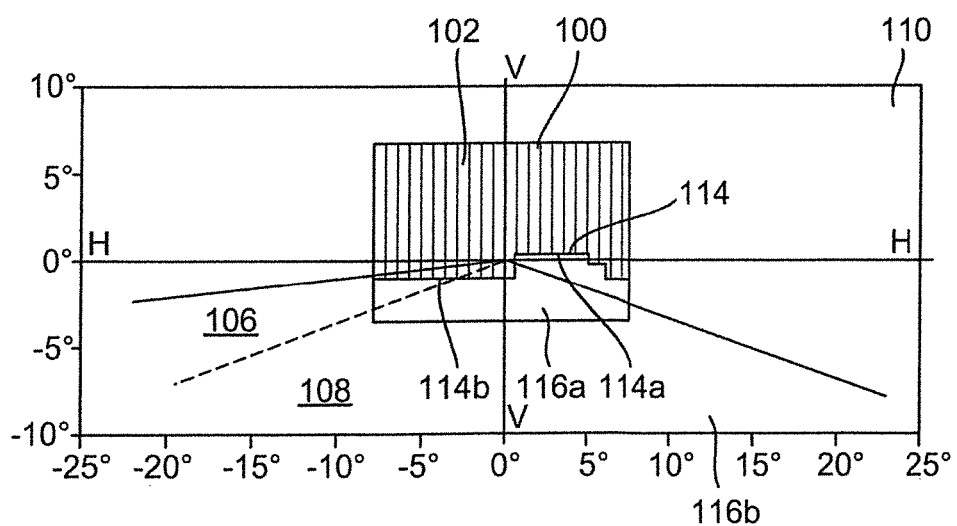
Figure 17:
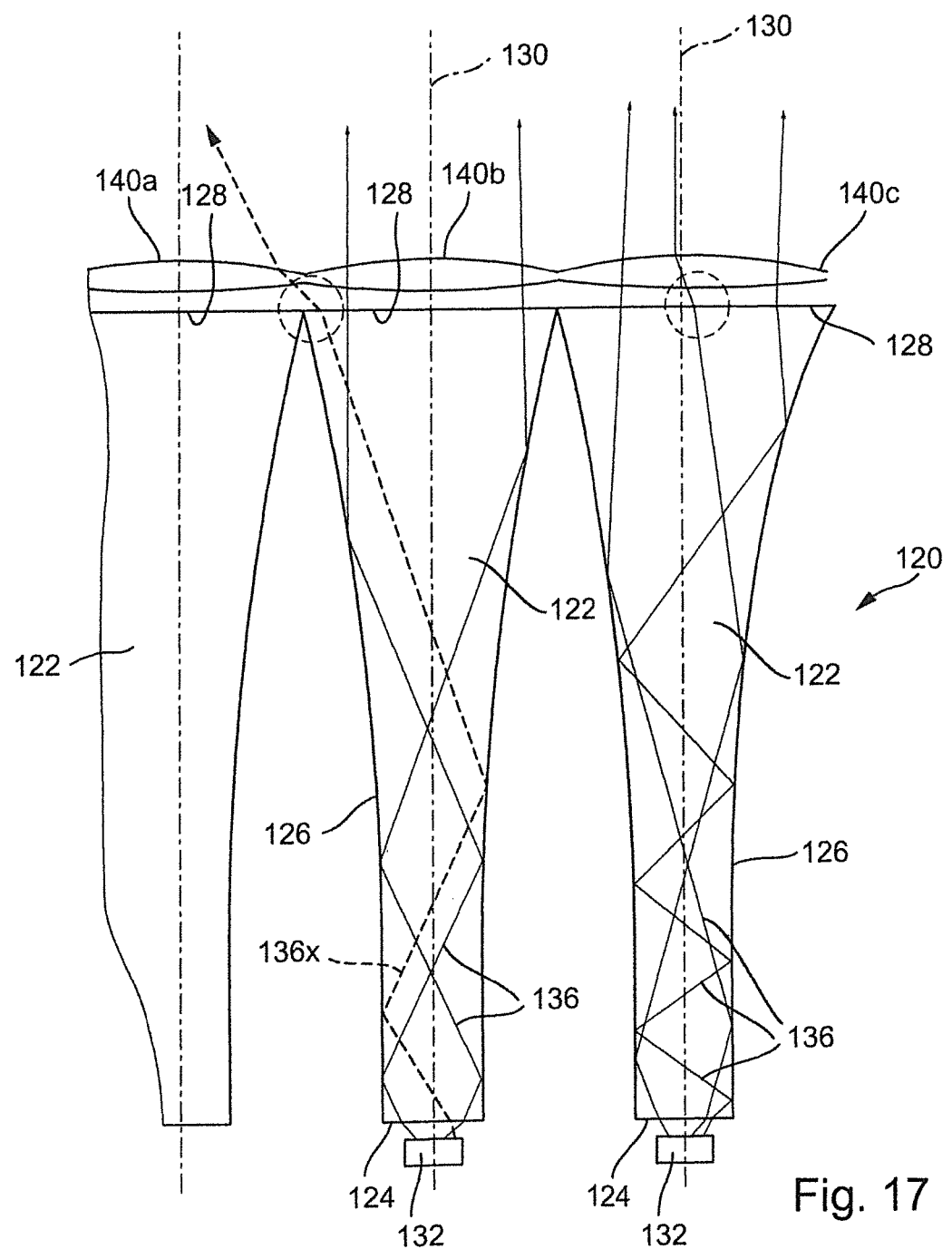
Figure 18:
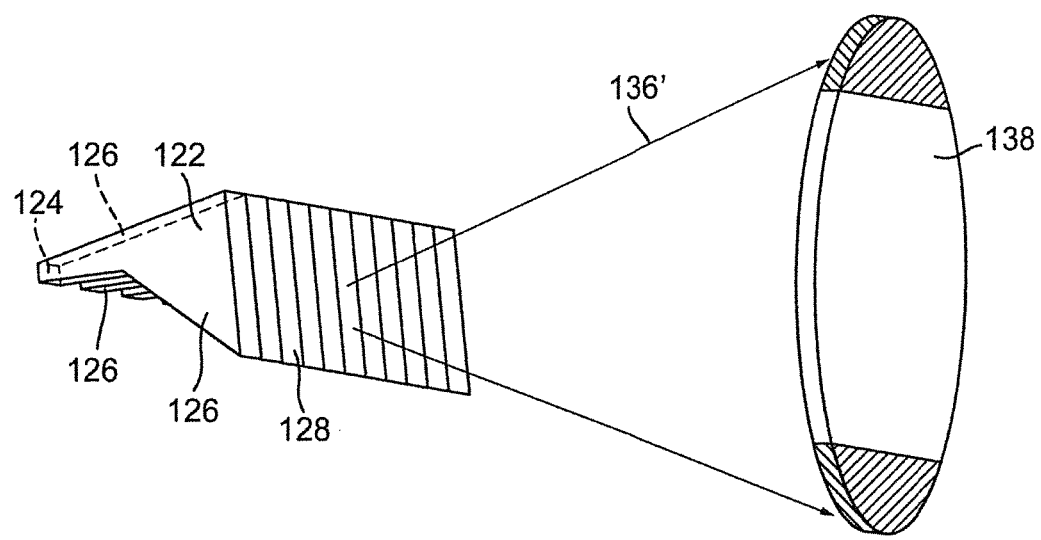
Figure 19:
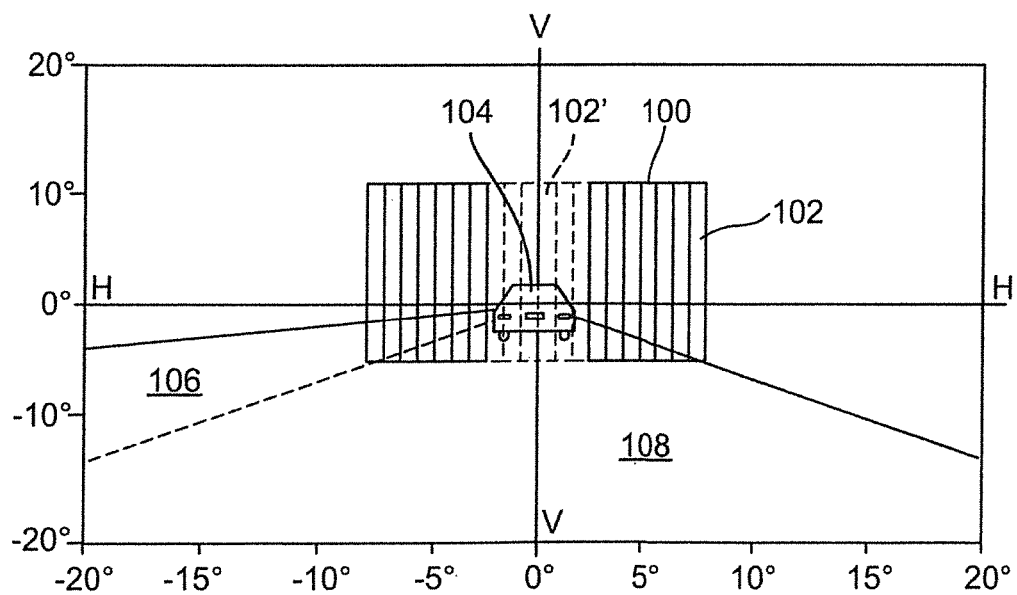
Figure 20:
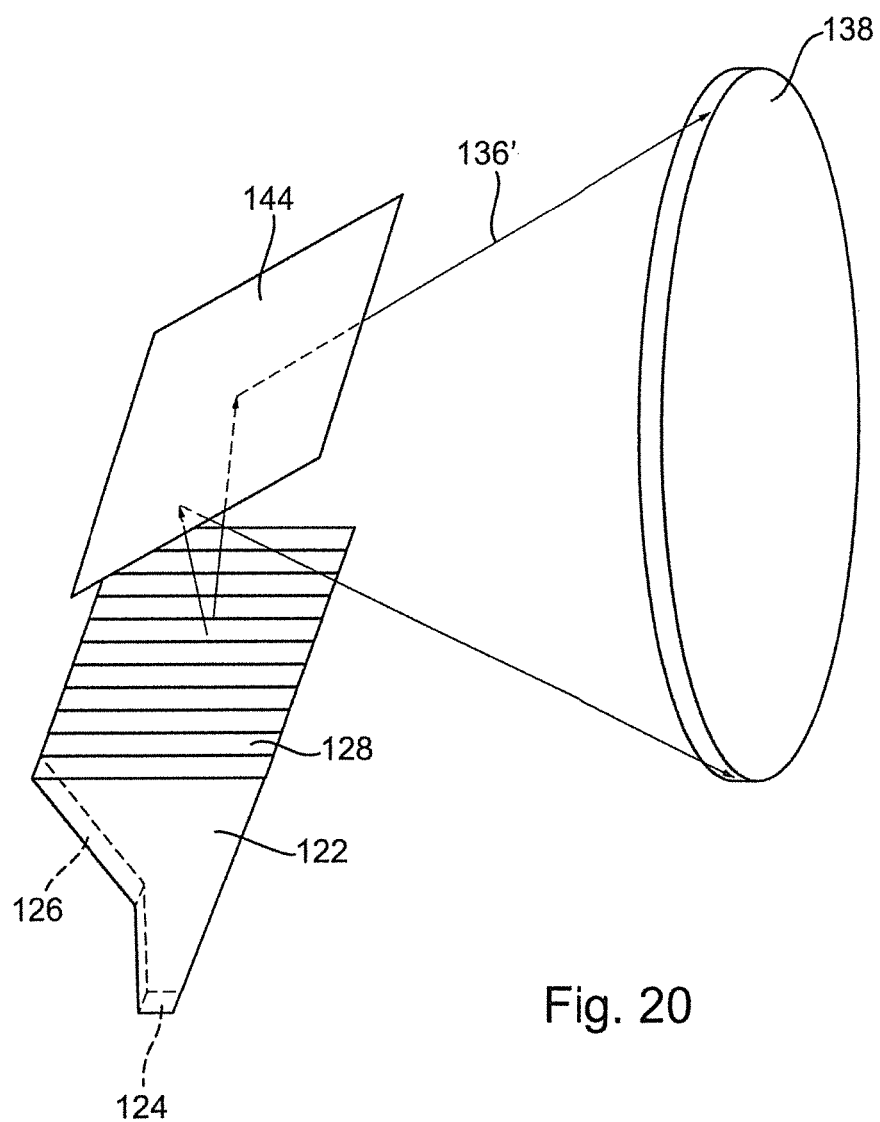
Figure 21:
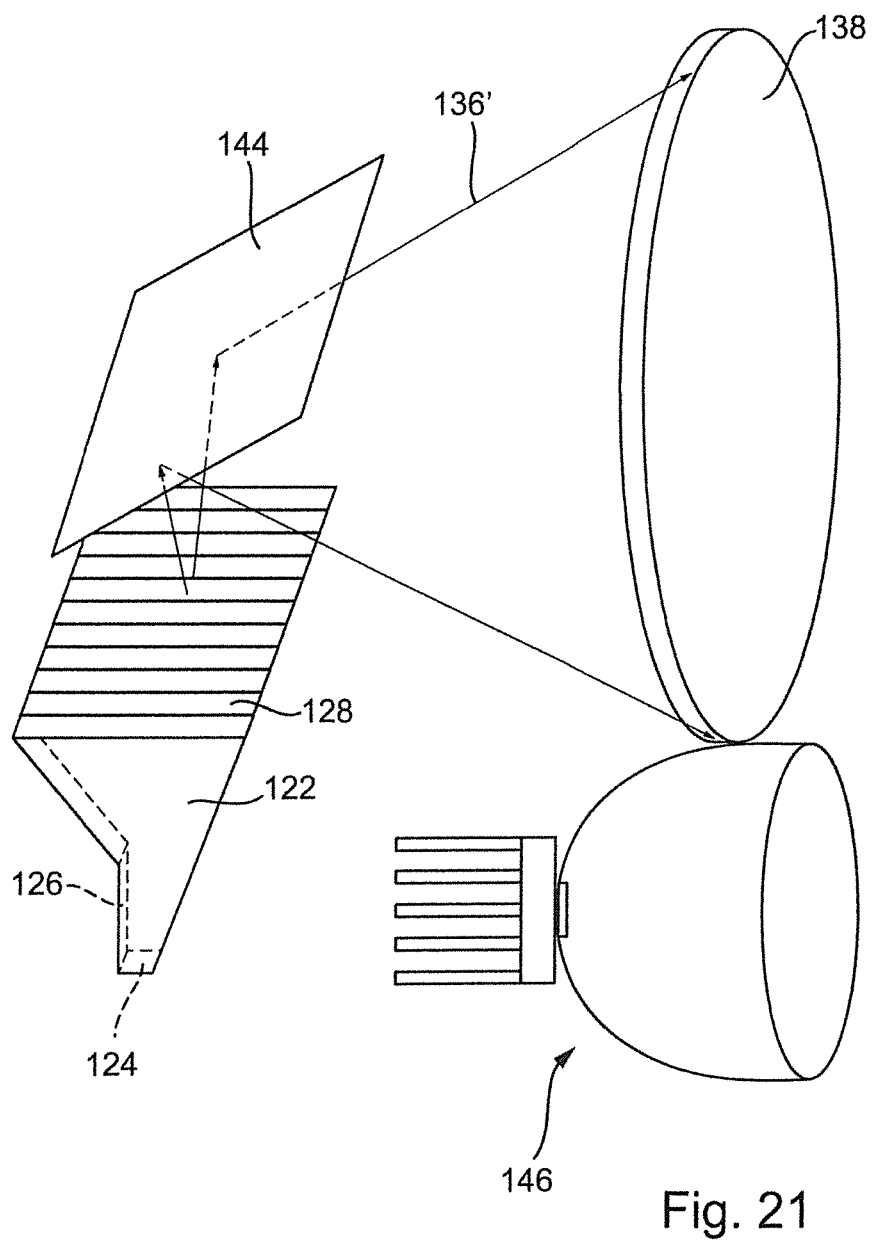
Figure 22:
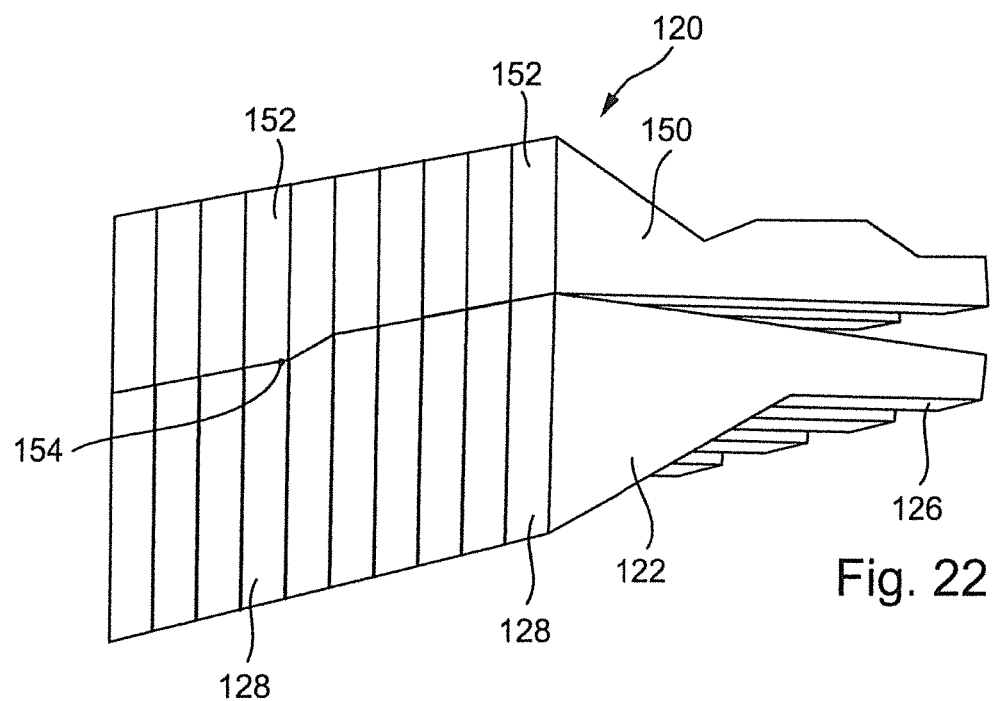
Figure 23:
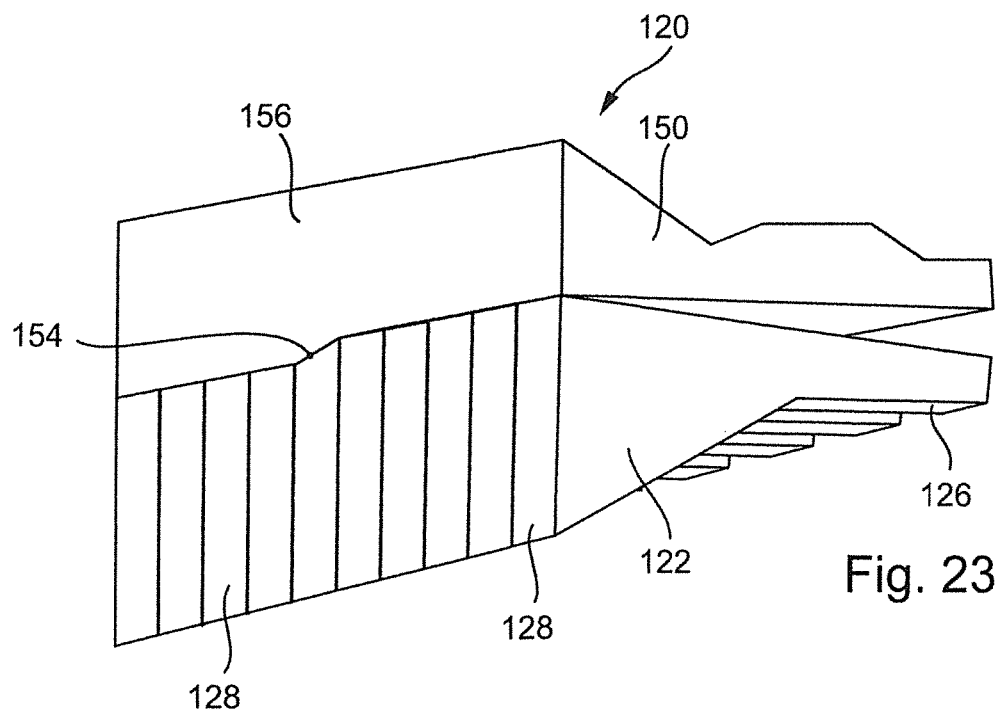
Figure 24:
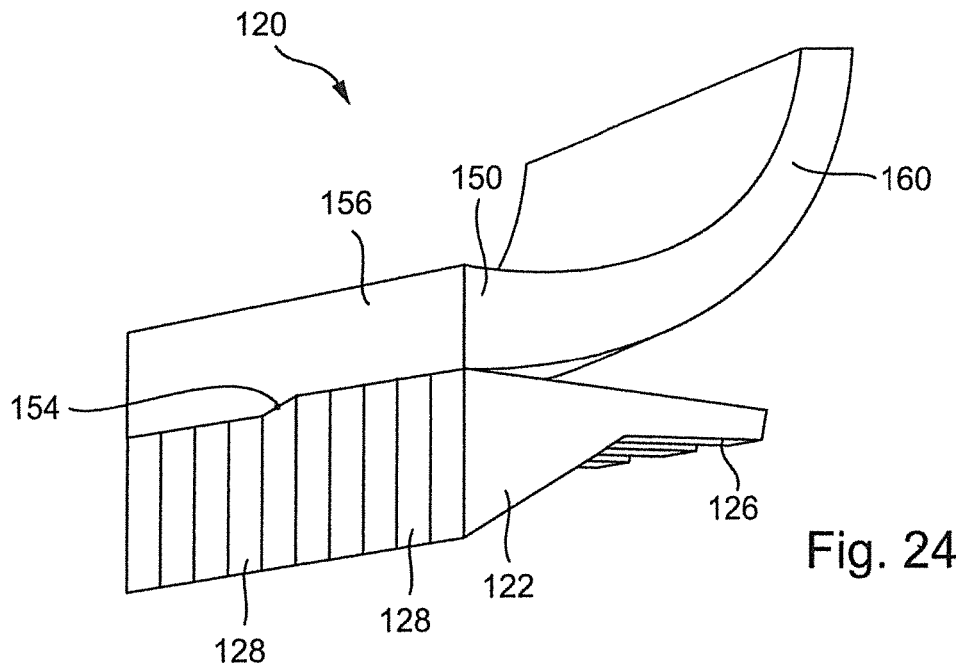
Figure 25:
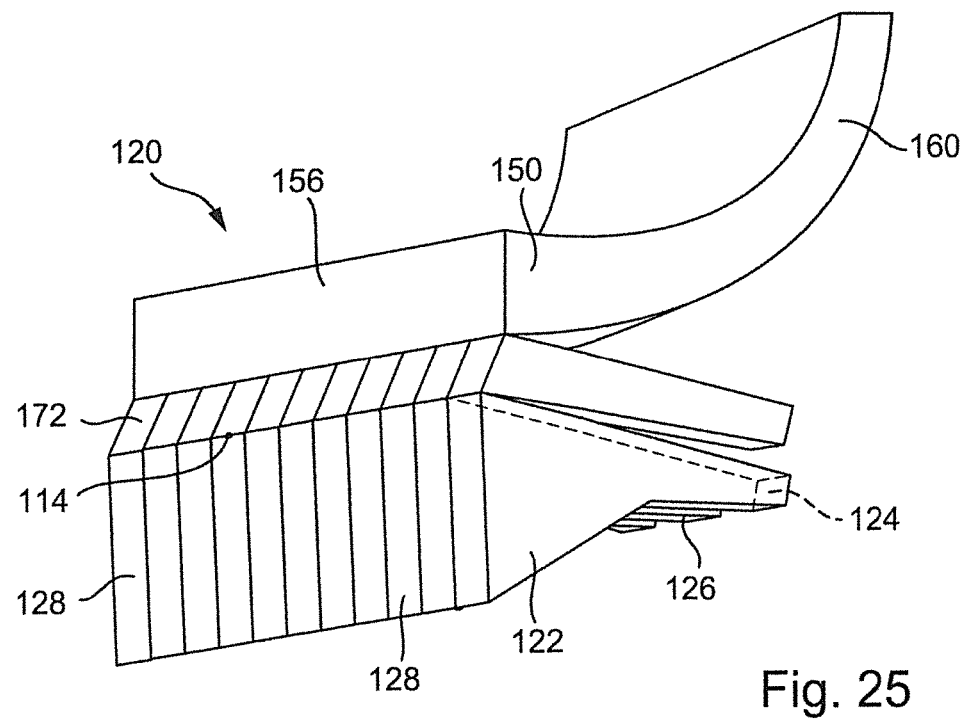

FIG. 6 is various light modules known from the prior art;
FIG. 7 is FIG. 2 of DE 102 52 228 A1;
FIG. 8 is FIG. 4b of DE 102 52 228 A1;
FIG. 9 is FIG. 2 of DE 103 02 969 A1;
FIG. 10 is FIG. 5b of DE 103 02 969 A1;
FIG. 11 is FIG. 5 of DE 10 2009 053 581 B3;
FIG. 12 is a spot distribution of a high-beam-light distribution obtained with a light module according to the invention and corresponding to a specific traffic situation;

FIG. 13 is a linear lens array of a light module according to the invention for generating a spot distribution of a high-beam-light distribution;

FIG. 14 is the linear lens array of FIG. 13 with an exemplary plotted light source;

FIG. 15 is a light path in a sub-module of a light module according to the invention for illustrating the "function" principle of the optical commutators of the lens array;

FIG. 16 is an example for a high-beam-light distribution with a spot distribution generated by the light module according to the invention;

FIG. 17 is a sectional view along a horizontal sectional plane "XVII" through the linear lens array of a light module according to the invention from FIG. 13;

FIG. 18 is a linear lens array of a light module according to the invention together with a secondary lens disposed in the light path;

FIG. 19 is a spot distribution of a high-beam-light distribution obtained with a light module according to the invention and corresponding to a specific traffic situation;

FIG. 20 is another embodiment of a light module according to the invention with a light path deflected by a mirror;

FIG. 21 is the light module from FIG. 20 in combination with another light module of a headlight;

FIG. 22 is another embodiment of a light module according to the invention in combination with another light module for generating a spot distribution of a low-beam-light distribution;

FIG. 23 is another embodiment of a light module according to the invention in combination with another light module for generating a spot distribution of a low-beam-light distribution;

FIG. 24 is another embodiment of a light module according to the invention in combination with another light module for generating a spot distribution of a low-beam-light distribution; and FIG. 25 is another embodiment of a light module according to the invention in combination with another light module for generating a spot distribution of a low-beam-light distribution and base distribution of a high-beam-light distribution.

DETAILED DESCRIPTION OF EMBODIMENTS OF INVENTION

The invention concerns, in general, a light module for creating a high-beam spot and, more particularly, a spot distribution of a high-beam-light distribution. For this, a high-beam-light distribution is generated by superimposing a bundled spot beam with a diffuse, widely scattered base light. While the spot beam is more responsible for the range of the high beams, the base light provides a so-called "halo effect" [i.e., for a flat illumination around the spot beam (for instance, for a good peripheral illumination of the roadway edges and illumination above the spot beam)] to prevent a so-called "tunnel effect," wherein, although the spot beam obtains a good distance range, the driver, due to the lack of illumination above the spot beam, has the impression of driving through a tunnel.

For this, the spot beam as well as base light can be limited to a "distance" region above a light/dark border of a lowbeam-light distribution. To generate a high beam that fulfills the legal requirements, the region below the light/dark border must also be illuminated by an additional light bundle or a low-beam bundle. In this case, the high-beam-light distribution and low-beam-light distribution supplement the high beams conforming to the legal stipulations. Limited overlapping of the high-beam-light distribution and low-beam-light distribution are possible.

It is also conceivable that the spot beam and base light extend into the region of the low-beam-light distribution below the light/dark border as well. In this case, a superimposition of the spot beam with the base lights can already lead to a high beam fulfilling the legal requirements such that an additional low-beam bundle is no longer required.

A high-beam-light distribution that can be created by a light module according to the invention, such as that resulting on a perpendicular test screen disposed at a distance to the light module, is shown, by way of example, in FIG. 12 indicated at 100. It can be seen clearly that the spot beam is subdivided into numerous vertical stripe-shaped segments 102. In so doing, in the example shown, the height of the segments 102 decreases from the center to the edge of the spot beam 100. It is also conceivable, however, that the stripe-shaped segments 102 have a substantially consistent height over the entire horizontal extension of the spot beam 100. Equally clearly visible is that some stripes 102' of the spot beam 100, located in a zone in which other road users 104 have been detected, are dimmed from the light distribution 100. It is also conceivable to dim only one of the segments if the zone were small enough (e.g., if the other road user is very far away from the vehicle). In the example depicted, the zone with the other road users 104 includes a roadway 106 lying in front of the vehicle, in which the light module according to the invention is incorporated, designated for oncoming traffic. For this, the vehicle is being driven on its own side of the road 108. This applies to right-hand traffic, but could be applied in a corresponding manner to left-hand traffic.

The spot distribution 100 is superimposed with a base distribution 110 in FIG. 12. This is subdivided into a few block segments 112, which, in their width, include the widths of numerous stripe-shaped segments 102 of the spot beam 100. In addition, the block segments 112 have a greater height than the stripes 102 of the spot beam 100. Only a part of the base light 110 is shown in FIG. 12, and this can extend in the horizontal plane further than shown in FIG. 12. It can be clearly seen that one stripe 112' of the base light 110, including a zone in which the other road user 104 has been detected, has been dimmed from the light distribution 110. It is also conceivable, as a matter of course, that more than one block segment 112' be dimmed if needed. A corresponding light module for generating a base light 100 of this type is, by way of example, the subject matter of the subsequently published DE 10 2011 017 632.2 and described therein in detail.

The base light 110 depicted, by way of example, in FIG. 12 extends to a horizontal light/dark border 114 of a low-beam-light distribution 116. The light/dark border 114 runs in this case, at least in sections, slightly below a horizontal plane "HH" of the light distribution. To obtain a high beam in accordance with the legal requirements, the high-beam-light distribution 100, 110 must be superimposed with an additional low-beam bundle, which can, for example, be a low-beam bundle 116 that extends below the light/dark border 114.

The spot beam 100 shown, by way of example, in FIG. 12 runs in a manner substantially symmetrical to a vertical plane "VV" of the light distribution. It is, however, conceivable that the light module for generating the spot beam 100 or parts therefrom be pivotal in the horizontal plane such that, when needed, a spot beam 100 that is disposed in a manner asymmetrical to the vertical plane "VV" can be generated.

A part of the light module according to the invention for generating the spot distribution 100 is shown, by way of example, in FIGS. 13 and 14. The light module includes a linear lens array 120 comprising numerous primary lens components 122 (so-called "optical commutators") disposed adjacently to one another in a line. The lens components 122 may be designed as front-mounted lenses (so-called "TIR lenses") made of a transparent material (e.g., glass, plastic, or silicone) or designed as an open collimator (e.g., conventional reflector). In the example depicted, the lens components 122 are designed as front-mounted lenses.

Each of the lens components 112 of the linear lens array 120 has at least one light-entry surface 124 facing at least one of the light sources designated to the lens component 122 and by which the light emitted from the light source(s) is coupled in the lens component 122. The lateral walls 126 of a lens component 122 are, in an embodiment, designed as light-reflecting surfaces (e.g., in the form of fully reflecting border surfaces of a front-mounted lens made of a transparent material with a refractive index n>1) or mirror surfaces of a reflector for reflecting at least a part of the coupled light. In addition, each lens component 122 has at least one light-exit surface 128 (in an embodiment, opposite the at least one light-entry surface 124) by which at least a part of the coupled light, if applicable, is decoupled after reflecting off the lateral surfaces 126. The exit surfaces 128 are stripe-shaped in a motor vehicle having a light module incorporated according to the stipulations and designed with a substantially vertical longitudinal extension. The lens components 122 become broader starting at the light-entry surfaces 124 toward the light-exit surfaces 128, at least in one plane, in a funnel shape such that at least one of the lateral walls 126 of the lens component 122 runs at a diagonal to a longitudinal axis 130 of the lens component 122. The lateral walls 126 may be designed as planar or bowed in a concave or convex fashion. The exit surfaces 128 of adjacently disposed lens components 122 border directly (in an embodiment, without a gap) on one another.

FIG. 14, by way of example, shows additionally a light source in the form of a light-emitting diode (LED) 132 designated to another of the foremost lens elements 122. The LED 132 is either attached directly or by a bracket to a cooling unit 134 and connected to an electrical-power source. The LED 132 is, in an embodiment, disposed in such a manner that its main-beam direction corresponds substantially to the longitudinal extension 130 of the lens component 122 to which it is designated. In addition, inside the lens component 122, some light beams 136 of the coupled light and the light fully reflected from the lateral walls 126, by way of example, are mapped in their path to the light-exit surface 128. Based on the mapped light beam 136, it can be readily seen that the coupled light expands in the vertical plane. To improve the efficiency of the system, it is conceivable that the light emitted from the LED 132 is first bundled before it is coupled in the lens component 122 by the light-entry surface 124. A TIR front-mounted lens suitable for bundling is known, for example, from DE 10 2007 033 438 A1. The front-mounted lens can even be an integral component of the entry surface 124.

The stripe-shaped light-exit surfaces 128 of the functional light module incorporated in the motor vehicle are higher than they are wide. Based on FIG. 15, it can be seen that the special aspect of a geometry of this type is that by the smaller concentration of light (in comparison with an LED matrix-type high beam) in the vertical plane in an exit cross-section of about 3°, the decoupled light beams 136' have a smaller divergence. For comparison, the decoupled light beams from a lens array of a conventional LED matrix-type beam are mapped with a broken line and indicated at 136". Due to the smaller divergence of the light beams 136', a very high degree of efficiency can be achieved with the accordingly lower height of a mapping-projection lens 138 disposed in the extended light path.

The embedding of the spot beam 100 in a high-beam-light distribution is sketched out in FIG. 16. In addition to the high-beam spot 100 and high-beam base light 110, an additional low-beam spot 116a and low-beam base light 116b is provided in the example depicted therein. In this case, the low-beam-light distribution 116 from FIG. 12 is subdivided into two parts (specifically, the spot 116a and base-light 116b). The high-beam spot 100 or low-beam spot 116a does not have the same wide illumination of a known, conventional bi-xenon or halogen low beam or high beam and would probably not be acceptable based on their appearance (although the legal requirements according to UN-ECE may be formally fulfilled). For this reason, for each light function (low beam/high beams), an additional base or halo illumination 110, 116b is provided to obtain peripheral illumination of 30° to 45° on the right and left sides of the vertical plane "VV." This peripheral illumination requires, however, only limited illuminance levels and can, for this reason, be technically achieved relatively easily with different systems.

In the depicted example, the stripes 102 of the high-beam spot 100 terminate at the bottom at the light/dark border 114 of the low-beam spot 116a. The light/dark border 114 has a substantially horizontal course, whereby one of the first sections 114a disposed in the side of the vehicle's own traffic is disposed higher than a second section 114b disposed on the oncoming-traffic side. A step is formed between the two horizontal sections 114a, 114b. The low-beam spot 116a can also be referred to as a "freeway-light spot." The high-beam base light 110 is not subdivided into different block segments and can be deactivated as a whole, if necessary, when other road users have been detected.

Representative exemplary characteristic properties of the high-beam spot 100 proposed according to embodiments of the invention are as follows:

Horizontal expansion of the individual stripe-shaped segments 102 between 0.5° and 3° (in an embodiment, between 1° and 1.5°);

Vertical expansion of the segments 102 of approximately 3° to 20° (in an embodiment, from 5°-15°) (in even another embodiment, from 5° to 8°);

The decoupling components (decoupling surfaces 128 of the individual optical commutator components 122) are higher than they are wide;

The decoupling components 128 can be variable in the periphery both in height as well as width; an embodiment has an enlargement of the horizontal width starting at a geometric street position of ±5° in the vertical plane on segments with 1.5° to 2° width;

A least one of the lateral surfaces 126 of the optical-commutator components 122 can be shaped in a light-forming manner as is known, for example, from DE 103 02 969 A1;

In the region of the mapping of the horizontal plane "HH," the light module according to the invention or spot distribution 100 of the high-beam-light distribution obtained thereby achieves its greatest intensity, in a manner analogous to a typical high beam, of approximately 80 lx to 120 lx; in the upward extension, the intensity in the segments 102 can decrease, as with typical high beams;

The power for the cooling (fan, heat pipes, etc.) for the LEDs can be adjusted for the dedicated power used for the light modules or LEDs 132;

Each LED 132 or light source of each lens component 122 can be operated individually (i.e., the power for the light sources can be individually adjusted). In this manner, when driving in a straight line, the LEDs 132 in a central region of the light module can be operated at a higher intensity, and the LEDs 132 at the edges can be operated at a lower intensity. As a result, a light distribution similar to high beams can be generated that, close to the "HV" point (intersection of the horizontal plane "HH" and vertical plane "VV"), has approximately 100 lx to 120 lx, but only 30 lx to 50 lx at the horizon at approximately 5° on the horizontal plane. With oncoming traffic 104 or receding vehicles 104, the power for the stripes 102 (i.e., the stripes 102 adjacent to the deactivated stripes 102') surrounding the vehicle in front 104 can be increased to the maximum power to improve the view there without blinding the vehicle in front;

In driving through a curve, the light mass (maximum in the middle and decreasing toward the edges) can also be varied by dynamic power assignment to the individual LEDs such that a high-beam-curve-light effect is obtained (moving to a maximum in the direction of the edge and following the course of the road/turning of the steering wheel);

The light distribution of neighboring functions [basically, a halo high beam 110 (cf. FIG. 16)] can be connected to the stripes 102 of the high-beam spot 100 or even overlap the edge of the stripes 102 located in the spot beam 100; and No sharply defined transition is necessary at the lower edge of the low-beam-light distribution 116b (cf. FIG. 16); if a low-beam spot 116a from another module is present, this too can overlap the high-beam spot 100.

The mapping of the light distribution at the exit point of individual lens components 122 can, in an embodiment, take place with a lens 138 (cf. FIGS. 15 and 18). Reflection systems, however, are also equally possible, but somewhat costly. The lens 138 is made of transparent material, glass, or, in an embodiment, plastic. Because the color dispersion of the mapping components (mapping lens) for the vertical and horizontal light/dark borders of individual stripes to be mapped becomes clearly visible, the lens 138 may be provided with a color correction on its surface or executed as a multiple lens having an achromatic correction of the mapping. An achromatic correction is also possible in a multiple-injection process with different plastics having, in turn, different refraction indices or "Abbe" numbers as is known, for example, from the subsequently published DE 10 2010 026 423.

Furthermore, the vertical expansion downward or upward can be diffused with the lens 138 to prevent horizontal sharp edges of the stripe-shaped light distribution 100. In addition, for the longitudinal segment edges, the principle known from DE 10 2009 053 581 B3 shall be explained in greater detail based on FIG. 17. FIG. 17 shows a sectional view along a substantially horizontal sectional plane "XVII" shown in FIG. 13. The funnel shape of the lens component 122 of the lens array 120 can be clearly seen. Due to the funnel shape, coupled light beams, or the light beams 136, are bundled by a light-entry surface 124 of a lens component 122. The bundled light beams exit the lens component 122 and contribute in a desired manner to the generation of one of the stripe-shaped segments 102 of the spot distribution 100 after passing through a secondary lens.

Some of the light beams, or the light beams 136x, cannot, however, be bundled in the desired manner and, after exiting the lens component 122, generate undesired maximum or minimum intensities in the segment 102 and, thereby, in the spot beam 100. To prevent this, additional optically effective exit lenses 140 are disposed in the continuation of the light paths downstream of the light-exit surfaces 128 of the lens components 122. Numerous exit lenses are designated to each of the lens components 122. As such, for the central lens component 122 shown in FIG. 17, for example, there is a main exit lens 140b with collecting characteristics on the optical axis 130 of the central lens component 122. And, adjacent to the main exit lens 140b, there is a secondary exit lens 140a, 140c on each side. A configuration of this type also applies to all other lens components 122 of the lens array 120.

A majority of the light bundled by one of the lens components 122 passes through the main exit lens (e.g., exit lens 140b) designated to the lens component 122, and the rest of the light bundled by the lens component 122 passes through the two secondary exit lenses (e.g., exit lenses 140a, 140c) designated to the lens component. For instance, those light beams 136x that are not bundled in the desired manner pass through the secondary exit lenses. Upon passing through the secondary exit lens, the light beam 136x becomes more scattered such that it no longer passes through the secondary lens (e.g., a projection lens 138 disposed in the light path downstream of the lens array 120), but instead passes therebeside or is blocked by a screen suited to this purpose. In this manner, the non-bundled or poorly bundled light beams, such as light beam 136x, are prevented from contributing to the generation of the spot beam 100.

The mapping-projection lens 138 (cf. FIG. 18) can also be non-round (i.e., within certain limits, have a variable outer contour of the lens surface). As such, it is conceivable, for example, that the lens 138 is flattened on the top and bottom surfaces (broken line in FIG. 18) such that the shaded region of the lens 138 is cut off. This results in a lens that can be incorporated in the system in a compact manner. In addition, a mounting bracket for the lens 138 or partially transparent components for scattering the light can be molded directly onto the optical surface of the lens 138 and/or light-exit surfaces 128 of the optical commutators 122.

FIG. 19 shows another embodiment of a high-beam-spot distribution 100 that can be obtained by the invention (like the stripe-shaped subdivision of the high-beam spot 100). Furthermore, it can be seen that the central stripes 102', in which another road user 104 is present, are deactivated to prevent a blinding of the road user 104 (on the other hand, however, enabling an optimal illumination next to the road user 104 by the activated stripes 102). The road user 104 in this case, is a receding vehicle in the same driving lane 108.

Representative exemplary characteristic properties of the mapping of embodiments of the decoupling component 128 are as follows:

Color-corrected mapping and limited color stripes [limited vertical aperture, resulting in a lower diffraction at the mapping lens, less color dispersion in the vertical plane, and smaller color fringes (for instance, in horizontal edges)];

Optical commutator 122 that can be produced from glass, silicone, or plastic;

Sharp vertical light/dark border (about 0.5° at 95% of the maximal intensity to the glare-free region at <5% of the maximal intensity);

Diffused horizontal edges;

Lens 138 not round and freely selectable lens contour (for instance, flattened);

Lens 138 achromatic for color compensation and combination of various materials having different "Abbe" numbers; and Lens 138 made of plastic or glass of differing materials having different "Abbe" numbers.

The light path 136' of the decoupling can run along different paths. The decoupling can, for example, be generated by a direct mapping with a lens 138 as is shown, for example, in FIG. 18. Alternatively, a mirror 144 or prism or another light-deflecting component can be disposed in the light path to deflect the light path 136' by, for example, 90° to the main exit direction of the light from the decoupling surfaces 128 of the optical commutators 122. A corresponding embodiment is shown in FIG. 20. In this manner, the installation depth of the light module according to the invention can be further reduced.

The installation space in a headlight housing or the front region of a motor vehicle that is freed up as a result of the deflection of the light path 136' may be used for an additional light module 146 for generating an additional light function (e.g., a daytime-running light, position light, or blinker light) or other components (block segments for halo high beams, etc.) as is shown, for example, in FIG. 21. The additional light module shown therein includes one or more LED light sources disposed on a cooling unit and a bundling lens in the form of a reflector. As a matter of course, other designs of the additional light module 146 are also conceivable.

Representative exemplary characteristic properties of embodiments of the light path 136' of the decoupling are as follows:

Reduction of the installation depth of the light module through deflection with a prism or mirror (FIG. 20);

Combination of the installation space in the headlight housing with other components (FIG. 21); and Combination of the cooling together with other components (this means that, for the LEDs 132 of the light module and LED light sources of the additional light module 146, the same cooling unit may be used).

In addition, it is conceivable to provide other components for decoupling in the headlight in addition to the stripe segments 122 for generating the vertical stripes 102 of the high-beam spot 100. In addition to the horizontal, adjacently disposed stripe segments 122, which generate the high beam, further decoupling components 150 may also be provided. Different possible embodiments are shown in FIGS. 22 through 24. Representative exemplary characteristic properties of respective embodiments of additional components 150 of the decoupling are as follows:

More lines on the decoupling components (cf. FIGS. 22 through 25);

Different technologies of the decoupling components (matrix, stripes, block components, etc.) (cf. FIGS. 22 through 25);

Different coupling orientations (cf. FIGS. 24 and 25); and

Spot beam 116a of the low beams and spot beam 100 of the high beams behind a common lens 138.

The additional decoupling component 150 from FIG. 22 includes multiple optical commutators disposed in a line adjacent to one another and having a vertically aligned light-exit surface 152. The light-exit surfaces 128 of the spot-beam module are bordered at the bottom by a substantially horizontal edge 154, which corresponds to the course of a light/dark border of a low-beam-light distribution. As a result, the stripes 102 obtain a vertical modification in the horizontal expansion at their lower surface such that the stripes 102 form an incline of the light/dark border 114, 114a with their lower surface (e.g., 15° to 45° incline), analogous to the typical low beam 116, 116a, 116b. The optical commutators 122 of the spot-beam lens array, therefore, generate stripe-shaped segments 102 of the high-beam-spot distribution 100 all of which run above the light/dark border 114, 114a of the low-beam-light distribution 116, 116a, 116b. The optical commutators of the additional decoupling component 150 generate stripe-shaped segments of a low-beam spot 116a and terminate at the top on the horizontal light/dark border 114, 114a. The two light modules collectively generate thereby a spot distribution 100, 116a, which lies both in the high-beam region as well as low-beam region.

The same applies for the embodiment shown in FIG. 23. Here, however, the additional decoupling component 150, instead of numerous optical commutators disposed adjacently to one another, includes only a single, wide, large decoupling component with a single light-exit surface 156. A similar component is used, for example, in DE 102 52 228 A1 and DE 103 02 969 A1 as an optical commutator. This component 150 also generates a low-beam spot 116a, which terminates at the top on the horizontal light/dark border 114, 114a. The low-beam spot 116a, however, has no stripe-shaped segments, but, rather, is designed as a single block segment. Here as well, the two light modules generate collectively a spot distribution 100, 116a lying both in the high-beam region as well as low-beam region.

The configuration shown in FIGS. 22 and 23 can, as depicted in FIG. 21 regarding the light path 136' of the decoupling, also be linked to a mirroring to reduce the installation depth of the light module or lens arrays 122, 150. The coupling also does not have to take place in a straight line, but can instead (as shown, for example, in FIGS. 24 and 25), for reasons of space or temperature, take place with an arbitrarily shaped and curved coupling lens 160. As a matter of course, it is understood that for this, instead of the block component 150 with a decoupling surface 156 of large area (cf. FIG. 23), a linear lens array may also be implemented having numerous optical collimators 152 disposed adjacently to one another and each of which has stripe-shaped decoupling surfaces 152 (cf. FIG. 22).

In FIG. 25, another embodiment is depicted in which yet another light module is disposed between the lens array 120 of the light module according to the invention and additional light module with the block component 150 and curved coupling component 160 disposed therebelow, which is very similar in its construction and function to the light module according to the invention. The individual optical collimators 170, however, do not become wider from their light-entry surfaces to their light-exit surfaces 172 in a funnel shape such that the exit surfaces 172 have substantially the same size as (or even slightly larger size than) the opposite entry surfaces. Light sources are disposed in front of the light-entry surfaces of the optical collimators 170 (in an embodiment, in the form of one or more LEDs) such that the light emitted therefrom is at least partially coupled in the optical collimators 170. The light exiting the exit surfaces 172 can, for example, be implemented to create a low-beam spot 116a, wherein a substantially straight light/dark border 114 is formed between the high-beam spot generated by the lens array 120 and low-beam spot 116a. The light from the additional block element 150 decoupled by the surface 156 may serve, for example, to form a base distribution (high-beam base light 110 or low-beam base light 116b or high-beam base light 110 and low-beam base light 116b).

With the embodiment of the invention shown in FIG. 25, a range component can be created from the matrix line 170, which simulates a curve light, the LEDs of which can be individually actuated and controlled in terms of the power supplied thereto. The range component 170 is disposed in FIG. 25 below the optical commutators 122 having stripe-shaped decoupling surfaces 128 for generating the high-beam spot 100.

Representative exemplary characteristic properties of the embodiment from FIG. 25 are as follows:

Numerous lines (122, 150, 170) of decoupling components (128, 156, 172);

Different technologies (e.g., matrix, stripes, block components, etc.);

Different coupling directions;

Curve light with diagonal stripes (172) possible; and

Spot beam (116a) of the low beam and curve light behind a common lens (138).

The second line of decouplers (cf. the lower line 150 in FIGS. 22 through 24 or middle line 170 in FIG. 25) can be used as a low-beam spot 116a. For this, an additional wide low-beam base light is necessary. At a higher speed of the vehicle, it may occur that the demand for an increased low-beam range is required (e.g., on a freeway or highway), but the high beam disposed above the decoupling lines 150, 170 for the low beam cannot or may not be switched "on." In this case, the entire module by a light-range regulator or, alternatively, simply the decoupling block 150, 170 by a micro-actuator can be displaced behind the lens 138. The micro-actuator offers the possibility of very efficiently (high level of precision and energy saving) achieving the very small vertical displacements (approximately 0.3 mm to 1 mm). To further increase the range of the light distribution, it is proposed that the power for the LEDs 132 be increased in the corresponding decoupling component 150, 170. By these measures, a freeway light can be obtained without a great deal of expenditure.

The invention concerns, therefore, a light module of a motor vehicle for generating a spot distribution 100 of a high-beam-light distribution 100, 110 formed by a superimposition of the spot distribution 100 and a base distribution 110 generated by at least one other module. It is proposed that the light module be subdivided into numerous separately controllable sub-modules, which generate numerous stripe-shaped segments 102 of the spot distribution 100, wherein the stripe-shaped segments 102 supplement the spot distribution 100. In the following, representative exemplary characteristics of embodiments of the invention are given, which can be used either alone or in an arbitrary combination.

In an embodiment, the sub-modules of the light module each have at least one light source 132, wherein the light sources 132 are designed as semiconductor-light sources [for instance, light-emitting diodes (LEDs)]. In an embodiment, the sub-modules are disposed adjacently to one another in exactly one line. In an embodiment, the sub-modules are designed and disposed such that the stripe-shaped segments 102 have a longitudinal extension in a vertical plane ("VV") or only slightly tilted from the vertical plane ("VV") on a perpendicular test screen disposed at a distance from the light module. In addition, in an embodiment, the sub-modules are designed and disposed such that the stripe-shaped segments 102 in the spot distribution 100 are disposed adjacently to one another in exactly one line.

In an embodiment, the sub-modules are designed such that the stripe-shaped segments 102 have sharply focused edges (at least on the sides). In an embodiment, the sub-modules are designed such that the gradient of the illumination level at the edges of the stripe-shaped segments 102 decreases within 0.5° in the horizontal plane from approximately 95% of a maximum intensity to less than 5% of the maximum intensity. In an embodiment, the light module has 10 to 30 (in even another embodiment, 20 to 25) sub-modules. For this, each of the sub-modules generates exactly one stripe-shaped segment 102 of the spot distribution (100). In an embodiment, the light module is disposed at an arbitrary location in the front region of a motor vehicle.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described above.

What is claimed is:

1. A light module of a motor vehicle for generating a spot distribution (100) of a high-beam-light distribution (100, 110) formed by superimposition of the spot distribution (100) and a base distribution (110) generated by at least one other module, wherein the light module comprises:
a plurality of separately controllable sub-modules that generate a plurality of stripe-shaped segments (102) of the spot distribution (100) that supplement the spot distribution (100).

2. The light module according to claim 1, wherein the sub-modules each have at least one light source (132) and, during operation of the light module, the at least one light source (132) is deactivated and the stripe-shaped segment (102) of which lies in a zone in which another road user (104) has been detected.

3. The light module according to claim 1, wherein a relationship of height of the stripe-shaped segment (102) to a width thereof is at least about 3:1.

4. The light module according to claim 3, wherein the relationship of the height of the stripe-shaped segment (102) to the width thereof is as much as about 10:1.

5. The light module according to claim 1, wherein a width of the spot distribution (100) has a maximum of about ±20° in a substantially horizontal plane and a minimum of about ±5° in the substantially horizontal plane.

6. The light module according to claim 5, wherein the width of the spot distribution (100) has a maximum of about ±10° substantially horizontally and a minimum of about ±7° substantially horizontally.

7. The light module according to claim 1, wherein a width of each of the stripe-shaped segments (102) is about 1° to 3° substantially horizontally on a substantially perpendicular test screen disposed at a distance from the light module.

8. The light module according to claim 7, wherein the width of each of the stripe-shaped segments (102) is about 1° to 1.5° substantially horizontally on the substantially perpendicular test screen disposed at the distance from the light module.

9. The light module according to claim 1, wherein a height of each of the stripe-shaped segments (102) is about 3° to 20° substantially vertically above a substantially horizontal plane (HH) on a substantially perpendicular test screen disposed at a distance to the light module.

10. The light module according to claim 9, wherein the height of each of the stripe-shaped segments (102) is about 5° to 15° substantially vertically above the substantially horizontal plane (HH) on the substantially perpendicular test screen disposed at the distance to the light module.

11. The light module according to claim 1, wherein the stripe-shaped segments (102) disposed adjacently in the spot distribution (100) have at most only a substantially small overlap at edges.

12. The light module according to claim 1, wherein overlap for each side is a maximum of substantially ¼ of a width of the stripe-shaped segments in a substantially horizontal plane.

13. The light module according to claim 12, wherein the overlap for each of the sides is a maximum of substantially 0.25° in the substantially horizontal plane.

14. The light module according to claim 1, wherein the stripe-shaped segments (102) disposed substantially close to a substantially vertical plane (VV) have a maximum luminosity level of about 80 lx to 120 lx in a proximity of an intersection (HV) of a substantially horizontal plane (HH) and a substantially vertical plane (VV).

15. The light module according to claim 14, wherein the stripe-shaped segments (102) disposed at a distance of about 5° from the substantially vertical plane (VV) have a maximum luminosity level of about 30 lx to 50 lx in the proximity of the substantially horizontal plane (HH).

16. The light module according to claim 1, wherein the light module has a plurality of semiconductor-light sources (132) that are disposed adjacently in a single line and emit visible light, a primary lens is disposed in a light path of the semiconductor-light sources (132) designed as a lens row having a plurality of optically effective components (122) that are disposed adjacently in a single line and bundle the light emitted from the semiconductor-light sources (132), at least one secondary lens (138) is disposed in a continuation of a course of the light path that maps the light bundle for obtaining the spot distribution in front of the motor vehicle, the primary lens (120) has optically effective exit lenses aside from the lens row with the optically effective components (122) disposed in the light path downstream of the lens row, each of the optically effective components (122) has a plurality of designated exit lenses (140), including a main exit lens (140b), with collecting properties on an optical axis (130) of the optically effective component (122) and adjacent to the main exit lens (140b) and at least one secondary exit lens (140a, 140c), a majority of the light bundled by one of the optically effective components (122) passes through the main exit lens (140b) designated to the optically effective component (122), and remaining light bundled by the optically effective component (122) passes through at least one of the secondary exit lenses designated to the optically effective component (122).

17. The light module according to claim 16, wherein the main exit lenses (140b) and secondary exit lenses (140a, 140c) each have a light-exit surface with a substantially longitudinal extension in a substantially vertical axis.

18. The light module according to claim 17, wherein the light-exit surfaces of respective neighboring exit lenses (140) border one another directly along lateral edges thereof.

19. A motor-vehicle headlight for generating a high-beam-light distribution (100, 110) formed by superimposition of a spot distribution (100) and a base distribution generated by at least one other module, the headlight comprising:
a light module for generating the spot distribution (100) of the high-beam-light distribution and including a plurality of separately controllable sub-modules that generate a plurality of stripe-shaped segments (102) of the spot distribution (100) that supplement the spot distribution (100).

20. The motor-vehicle headlight according to claim 19, wherein the light module is subdivided into a plurality of separately controllable sub-modules that generate a plurality of stripe-shaped segments (102) of the spot distribution (100), the stripe-shaped segments (102) supplement the spot distribution (100), the sub-modules each have at least one light source (132) that is deactivated while the light module is in operation and the stripe-shaped segment (102) of which would lie in a zone in which another road user (104) has been detected, and control of the light sources (132) of the sub-modules is adjusted to control of a base module such that, at substantially a same time as a deactivation of at least a respective part of the base distribution (110; 116*b*) that would lie in the zone in which the other road user (104) has been detected, the at least one light source (132) that is to be deactivated is deactivated.

21. A headlight system for a motor vehicle, the system comprising:
a pair of motor-vehicle headlights disposed in a front region toward sides of the vehicle and each of which generates a high-beam-light distribution (100, 110) formed by superimposition of a spot distribution (100) and a base distribution generated by at least one other module, wherein one of the headlights includes a light module that generates stripe-shaped segments (102) of a left side of the spot distribution (100) and the other of the headlights includes a light module that generates stripe-shaped segments (102) of a right side of the spot distribution (100) such that the stripe-shaped segments (102) of the light modules of the headlights either of supplement the spot distribution (100) and are at least partially superimposed thereon.

\* \* \* \* \*